US009237114B2

(12) United States Patent  
Richardson et al.

(10) Patent No.: US 9,237,114 B2  
(45) Date of Patent: *Jan. 12, 2016

(54) MANAGING RESOURCES IN RESOURCE CACHE COMPONENTS

(71) Applicant: Amazon Technologies, Inc., Reno, NV (US)

(72) Inventors: David R. Richardson, Seattle, WA (US); Bradley E. Marshall, Bainbridge Island, WA (US); Swaminathan Sivasubramanian, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 354 days.

This patent is subject to a terminal disclaimer.

(21) Appl. No.: 13/829,586

(22) Filed: Mar. 14, 2013

(65) Prior Publication Data

US 2013/0205030 A1  Aug. 8, 2013

Related U.S. Application Data

(63) Continuation of application No. 12/412,443, filed on Mar. 27, 2009, now Pat. No. 8,412,823.

(51) Int. Cl.
*G06F 13/00* (2006.01)
*H04L 12/911* (2013.01)
*H04L 29/08* (2006.01)

(52) U.S. Cl.
CPC ............ *H04L 47/70* (2013.01); *H04L 67/2852* (2013.01)

(58) Field of Classification Search
CPC .............. H04L 29/08144; H04L 29/06; H04L 29/08072; H04L 29/08171; H04L 12/5695
USPC ........................................................ 709/226
See application file for complete search history.

(56) References Cited

U.S. PATENT DOCUMENTS 5,341,477 A   8/1994  Pitkin et al.
5,611,049 A   3/1997  Pitts
(Continued)

FOREIGN PATENT DOCUMENTS

CA   2741 895 A1   5/2010
CN   1422468 A    6/2003
(Continued)

OTHER PUBLICATIONS

"Global Server Load Balancing with ServerIron," Foundry Networks, retrieved Aug. 30, 2007, from http://www.foundrynet.com/pdf/an-global-server-load-bal.pdf, 7 pages.
(Continued)

*Primary Examiner* — Robert B Harrell

(74) *Attorney, Agent, or Firm* — Knobbe Martens Olson & Bear LLP

(57) ABSTRACT

A system, method, and computer readable medium for managing resources maintained in resource cache components are provided. A network storage provider storing one or more resources on behalf of a content provider obtains client computing device requests for content. The network storage provider provides resources that are received and maintained on resource cache components. The network storage provider either processes requests or provides notifications to the resource cache components to facilitate the management of resources that need to be updated or are otherwise treated as invalid.

25 Claims, 22 Drawing Sheets

(56) References Cited

U.S. PATENT DOCUMENTS

| | | |
|---|---|---|
| 5,701,467 A | 12/1997 | Freeston |
| 5,764,910 A | 6/1998 | Shachar |
| 5,774,660 A | 6/1998 | Brendel et al. |
| 5,852,717 A | 12/1998 | Bhide et al. |
| 5,892,914 A | 4/1999 | Pitts |
| 5,893,116 A | 4/1999 | Simmonds et al. |
| 5,933,811 A | 8/1999 | Angles et al. |
| 5,974,454 A | 10/1999 | Apfel et al. |
| 6,016,512 A | 1/2000 | Huitema |
| 6,026,452 A | 2/2000 | Pitts |
| 6,052,718 A | 4/2000 | Gifford |
| 6,078,960 A | 6/2000 | Ballard |
| 6,085,234 A | 7/2000 | Pitts et al. |
| 6,098,096 A | 8/2000 | Tsirigotis et al. |
| 6,108,703 A | 8/2000 | Leighton et al. |
| 6,157,942 A | 12/2000 | Chu et al. |
| 6,167,438 A | 12/2000 | Yates et al. |
| 6,167,446 A | 12/2000 | Lister et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,243,761 B1 | 6/2001 | Mogul et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Mullins |
| 6,405,252 B1 | 6/2002 | Gupta et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,505,241 B2 | 1/2003 | Pitts |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,643,357 B2 | 11/2003 | Lumsden |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,874,017 B1 | 3/2005 | Inoue et al. |
| 6,917,951 B2 | 7/2005 | Orbits et al. |
| 6,928,467 B2 | 8/2005 | Peng |
| 6,928,485 B1 | 8/2005 | Krishnamurthy et al. |
| 6,941,562 B2 | 9/2005 | Gao et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,031,445 B2 | 4/2006 | Lumsden |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,216,170 B2 | 5/2007 | Danker et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,274,658 B2 | 9/2007 | Bornstein et al. |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,339,937 B2 | 3/2008 | Mitra et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,373,416 B2 | 5/2008 | Kagan et al. |

(56) References Cited

U.S. PATENT DOCUMENTS

| | | |
|---|---|---|
| 7,376,736 B2 | 5/2008 | Sundaram et al. |
| 7,380,078 B2 | 5/2008 | Ikegaya et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,430,610 B2 | 9/2008 | Pace et al. |
| 7,441,045 B2 | 10/2008 | Skene et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,594,189 B1 | 9/2009 | Walker et al. |
| 7,596,619 B2 | 9/2009 | Leighton et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,685,251 B2 | 3/2010 | Houlihan et al. |
| 7,693,813 B1 | 4/2010 | Cao et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlstedt et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,787,380 B1 | 8/2010 | Aggarwal et al. |
| 7,792,989 B2 | 9/2010 | Toebes et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,404 B2 | 8/2011 | Wong et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,010,707 B2 | 8/2011 | Elzur et al. |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,135,820 B2 | 3/2012 | Richardson et al. |
| 8,156,243 B2 | 4/2012 | Richardson et al. |
| 8,190,682 B2 | 5/2012 | Paterson-Jones et al. |
| 8,195,837 B2 | 6/2012 | McCarthy et al. |
| 8,224,986 B1 | 7/2012 | Liskov et al. |
| 8,234,403 B2 | 7/2012 | Richardson et al. |
| 8,239,530 B2 | 8/2012 | Sundaram et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,301,645 B1 | 10/2012 | Crook |
| 8,321,568 B2 | 11/2012 | Sivasubramanian et al. |
| 8,402,137 B2 | 3/2013 | Sivasubramanian et al. |
| 8,433,749 B2 | 4/2013 | Wee et al. |
| 8,447,876 B2 | 5/2013 | Verma et al. |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,908 B2 | 8/2013 | Holmes et al. |
| 8,526,405 B2 | 9/2013 | Curtis et al. |
| 8,527,658 B2 | 9/2013 | Holmes et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,615,549 B2 | 12/2013 | Knowles et al. |
| 8,626,950 B1 | 1/2014 | Richardson et al. |

(56) References Cited

U.S. PATENT DOCUMENTS

| | | |
|---|---|---|
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,076 B2 | 3/2014 | Farber et al. |
| 8,688,837 B1 | 4/2014 | Richardson et al. |
| 8,732,309 B1 | 5/2014 | Richardson et al. |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,819,283 B2 | 8/2014 | Richardson et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,938,526 B1 | 1/2015 | Richardson et al. |
| 8,966,318 B1 | 2/2015 | Shah |
| 9,003,035 B1 | 4/2015 | Richardson et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,083,675 B2 | 7/2015 | Richardson et al. |
| 9,083,743 B1 | 7/2015 | Patel et al. |
| 9,106,701 B2 | 8/2015 | Richardson et al. |
| 2001/0000811 A1 | 5/2001 | May et al. |
| 2001/0025305 A1 | 9/2001 | Yoshiasa |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010798 A1 | 1/2002 | Ben-Shaul et al. |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0091786 A1 | 7/2002 | Yamaguchi et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0156911 A1 | 10/2002 | Croman et al. |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0187935 A1 | 12/2002 | Redmond et al. |
| 2002/0188722 A1 | 12/2002 | Banerjee et al. |
| 2002/0198953 A1 | 12/2002 | O'Rourke et al. |
| 2003/0002484 A1 | 1/2003 | Freedman |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0120741 A1 | 6/2003 | Wu et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145038 A1 | 7/2003 | Bin Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2004/0010563 A1 | 1/2004 | Forte et al. |
| 2004/0010621 A1 | 1/2004 | Afergan et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0059805 A1 | 3/2004 | Dinker et al. |
| 2004/0064501 A1 | 4/2004 | Jan et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0167982 A1 | 8/2004 | Cohen et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0249939 A1 | 12/2004 | Amini et al. |

(56) References Cited

U.S. PATENT DOCUMENTS

| | | |
|---|---|---|
| 2004/0249971 A1 | 12/2004 | Klinker |
| 2004/0249975 A1 | 12/2004 | Tuck et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0157712 A1 | 7/2005 | Rangarajan et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0198334 A1 | 9/2005 | Farber et al. |
| 2005/0198571 A1 | 9/2005 | Kramer et al. |
| 2005/0216569 A1 | 9/2005 | Coppola et al. |
| 2005/0216674 A1 | 9/2005 | Robbin et al. |
| 2005/0229119 A1 | 10/2005 | Torvinen |
| 2005/0232165 A1 | 10/2005 | Brawn et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0047787 A1 | 3/2006 | Agarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0143293 A1 | 6/2006 | Freedman |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0168088 A1 | 7/2006 | Leighton et al. |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156919 A1 | 7/2007 | Potti et al. |
| 2007/0162331 A1 | 7/2007 | Sullivan |
| 2007/0168517 A1 | 7/2007 | Weller et al. |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tai |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2008/0005057 A1 | 1/2008 | Ozzie et al. |
| 2008/0008089 A1 | 1/2008 | Bornstein et al. |
| 2008/0025304 A1 | 1/2008 | Venkataswami et al. |

(56) References Cited

U.S. PATENT DOCUMENTS

| | | |
|---|---|---|
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086574 A1 | 4/2008 | Raciborski et al. |
| 2008/0103805 A1 | 5/2008 | Shear et al. |
| 2008/0104268 A1 | 5/2008 | Farber et al. |
| 2008/0114829 A1 | 5/2008 | Button et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0086741 A1 | 4/2009 | Zhang |
| 2009/0089869 A1 | 4/2009 | Varghese |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0254661 A1 | 10/2009 | Fullagar et al. |
| 2009/0259971 A1 | 10/2009 | Rankine et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0023601 A1 | 1/2010 | Lewin et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0057894 A1 | 3/2010 | Glasser |
| 2010/0070603 A1 | 3/2010 | Moss et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0100629 A1 | 4/2010 | Raciborski et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0192225 A1 | 7/2010 | Ma et al. |
| 2010/0217801 A1 | 8/2010 | Leighton et al. |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0274765 A1 | 10/2010 | Murphy et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0332595 A1 | 12/2010 | Fullagar et al. |
| 2011/0029598 A1 | 2/2011 | Arnold et al. |
| 2011/0040893 A1 | 2/2011 | Karaoguz et al. |
| 2011/0055714 A1 | 3/2011 | Vemulapalli et al. |
| 2011/0078000 A1 | 3/2011 | Ma et al. |
| 2011/0078230 A1 | 3/2011 | Sepulveda |
| 2011/0087769 A1 | 4/2011 | Holmes et al. |
| 2011/0096987 A1 | 4/2011 | Morales et al. |

(56) References Cited

U.S. PATENT DOCUMENTS

| | | |
|---|---|---|
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0191449 A1 | 8/2011 | Swildens et al. |
| 2011/0191459 A1 | 8/2011 | Joshi |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agrawal et al. |
| 2011/0238501 A1 | 9/2011 | Almeida |
| 2011/0238793 A1 | 9/2011 | Bedare et al. |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0320559 A1 | 12/2011 | Foti |
| 2012/0036238 A1 | 2/2012 | Sundaram et al. |
| 2012/0066360 A1 | 3/2012 | Ghosh |
| 2012/0089972 A1 | 4/2012 | Scheidel et al. |
| 2012/0096065 A1 | 4/2012 | Suit et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0166516 A1 | 6/2012 | Simmons et al. |
| 2012/0169646 A1 | 7/2012 | Berkes et al. |
| 2012/0173677 A1 | 7/2012 | Richardson et al. |
| 2012/0173760 A1 | 7/2012 | Jog et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0233522 A1 | 9/2012 | Barton et al. |
| 2012/0233668 A1 | 9/2012 | Leafe et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0019311 A1 | 1/2013 | Swildens et al. |
| 2013/0041872 A1 | 2/2013 | Aizman et al. |
| 2013/0046869 A1 | 2/2013 | Jenkins et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0086001 A1 | 4/2013 | Bhogal et al. |
| 2013/0117849 A1 | 5/2013 | Golshan et al. |
| 2013/0130221 A1 | 5/2013 | Kortemeyer et al. |
| 2013/0151646 A1 | 6/2013 | Chidambaram et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0268616 A1 | 10/2013 | Sakata et al. |
| 2013/0305046 A1 | 11/2013 | Mankovski et al. |
| 2013/0311605 A1 | 11/2013 | Richardson et al. |
| 2013/0318153 A1 | 11/2013 | Sivasubramanian et al. |
| 2013/0339429 A1 | 12/2013 | Richardson et al. |
| 2013/0346567 A1 | 12/2013 | Richardson et al. |
| 2014/0040478 A1 | 2/2014 | Hsu et al. |
| 2014/0053022 A1 | 2/2014 | Forgette et al. |
| 2014/0059198 A1 | 2/2014 | Richardson et al. |
| 2014/0075109 A1 | 3/2014 | Richardson et al. |
| 2014/0143320 A1 | 5/2014 | Sivasubramanian et al. |
| 2014/0257891 A1 | 9/2014 | Richardson et al. |
| 2014/0297870 A1 | 10/2014 | Eggleston et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0365666 A1 | 12/2014 | Richardson et al. |
| 2015/0081842 A1 | 3/2015 | Richardson et al. |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188994 A1 | 7/2015 | Marshall et al. |
| 2015/0195244 A1 | 7/2015 | Richardson et al. |
| 2015/0207733 A1 | 7/2015 | Richardson et al. |
| 2015/0215270 A1 | 7/2015 | Sivasubramanian et al. |

FOREIGN PATENT DOCUMENTS

| | | |
|---|---|---|
| CN | 1605182 A | 4/2005 |
| CN | 101189598 A | 5/2008 |
| CN | 101460907 A | 6/2009 |
| CN | 103731481 A | 4/2014 |
| EP | 1603307 A2 | 12/2005 |
| EP | 1351141 A2 | 10/2007 |
| EP | 2008167 | 12/2008 |
| JP | 2001-0506093 | 5/2001 |
| JP | 2001-249907 | 9/2001 |
| JP | 2002-044137 | 2/2002 |
| JP | 2003-167810 A | 6/2003 |
| JP | 2003-167813 A | 6/2003 |
| JP | 2003188901 A | 7/2003 |
| JP | 2003522358 A | 7/2003 |
| JP | 2004-533738 A | 11/2004 |
| JP | 2005-537687 | 12/2005 |
| JP | 2007-133896 A | 5/2007 |
| JP | 2009-071538 A | 4/2009 |
| JP | 2012-209623 | 10/2012 |
| WO | WO 02/069608 A2 | 9/2002 |
| WO | WO 2005/071560 A1 | 8/2005 |
| WO | WO 2007/007960 A1 | 1/2007 |
| WO | WO 2007/126837 A3 | 11/2007 |
| WO | WO 2009/124006 A2 | 10/2009 |
| WO | WO 2010/002603 A1 | 1/2010 |
| WO | WO 2012/044587 | 4/2012 |
| WO | WO 2012/044587 A1 | 4/2012 |

OTHER PUBLICATIONS

"Grid Computing Solutions," Sun Microsystems, Inc., retrieved May 3, 2006, from http://www.sun.com/software/grid, 3 pages.

"Grid Offerings," Java.net, retrieved May 3, 2006, from http://wiki.java.net/bin/view/Sungrid/OtherGridOfferings, 8 pages.

"Recent Advances Boost System Virtualization," eWeek.com, retrieved from May 3, 2006, http://www.eWeek.com/article2/0,1895,1772626,00.asp, 5 pages.

"Scaleable Trust of Next Generation Management (STRONG-MAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Softricity Desktop," Softricity, Inc., retrieved May 3, 2006, from http://www.softricity.com/products/, 3 pages.

"Xen—The Xen virtual Machine Monitor," University of Cambridge Computer Laboratory, retrieved Nov. 8, 2005, from http://www.cl.cam.ac.uk/Research/SRG/netos/xen/, 2 pages.

(56) References Cited

OTHER PUBLICATIONS

"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.
Baglioni et al., "Preprocessing and Mining Web Log Data for Web Personalization", LNAI 2829, 2003, pp. 237-249.
Bellovin, S., "Distributed Firewalls,";login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
First Office Action in Chinese Application No. 200980111426.1 mailed Feb. 16, 2013.
First Office Action in Chinese Application No. 200980119993.1 dated Jul. 4, 2012.
First Office Action in Chinese Application No. 200980119995.0 dated Jul. 6, 2012.
First Office Action in Chinese Application No. 200980145872.4 dated Nov. 29, 2012.
Gruener, J., "A Vision of Togetherness," May 24, 2004, NetworkWorld, retrieved May 3, 2006, from, http://www.networkworld.com/supp/2004/ndc3/0524virt.html, 9 pages.
International Preliminary Report on Patentability in PCT/US2007/007601 mailed Sep. 30, 2008 in 8 pages.
International Search Report and Written Opinion in PCT/US07/07601 mailed Jul. 18, 2008 in 11 pages.
International Search Report and Written Opinion in PCT/US2010/060567 mailed on Mar. 28, 2012.
International Search Report and Written Opinion in PCT/US2011/053302 mailed Nov. 28, 2011 in 11 pages.
International Search Report and Written Opinion in PCT/US2011/061486 mailed Mar. 30, 2012 in 11 pages.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kenshi, P., "Help File Library: Iptables Basics," Justlinux, retrieved Dec. 1, 2005, from http://www.justlinux.com/nhf/Security/Iptables_Basics.html, 4 pages.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Office Action in Candian Application No. 2741895 dated Feb. 25, 2013.
Office Action in Japanese Application No. 2011-502138 mailed Feb. 1, 2013.
Office Action in Japanese Application No. 2011-502140 mailed Dec. 7, 2012.
Office Action in Japanese Application No. 2012-052264 mailed Dec. 11, 2012 in 26 pages.
Search Report and Written Opinion in Singapore Application No. 201103333-9 mailed Nov. 19, 2012.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Singapore Examination Report in Application No. 201006837-7 mailed May 16, 2012.
Singapore Written Opinion in Application No. 201006836-9, mailed Apr. 30, 2012 in 10 pages.
Singapore Written Opinion in Application No. 201006836-9, mailed Oct. 12, 2011 in 12 pages.
Singapore Written Opinion in Application No. 201006837-7, mailed Oct. 12, 2011 in 11 pages.
Singapore Written Opinion in Application No. 201006874-0, mailed Oct. 12, 2011 in 10 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Supplementary European Search Report in Application No. 07754164.7 mailed Dec. 20, 2010 in 7 pages.
Supplementary European Search Report in Application No. 09727694.3 mailed Jan. 30, 2012 in 6 pages.
Supplementary European Search Report in Application No. 09728756.9 mailed Jan. 8, 2013.
Takizawa, et al., "Scalable MultiReplication Framework on The Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, I5 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.

(56) References Cited

OTHER PUBLICATIONS

Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bennami, M., et al., Resource Allocation for Autonomic Data Centers Using Analytic Performance Models, 2005, IEEE, 12 pages.
Chipara et al, "Realtime Power-Aware Routing in Sensor Network", IEEE, 2006, 10 pages.
International Preliminary Report on Patentability and Written Opinion in PCT/US2010/060567 mailed on Jun. 19, 2012.
International Preliminary Report on Patentability and Written Opinion in PCT/US2010/060569 mailed Jun. 19, 2012.
International Preliminary Report on Patentability and Written Opinion in PCT/US2010/060573 mailed Jun. 19, 2012.
International Preliminary Report on Patentability in PCT/US2011/053302 mailed Apr. 2, 2013.
International Preliminary Report on Patentability in PCT/US2011/061486 mailed May 22, 2013.
Kounev, S., et al., Autonomic QoS-Aware Resource Management in Grid Computing Using Online Performance Models, 2007, ICST, Valuetools, 2007, 10 pages.
Office Action in Canadian Application No. 2726915 dated May 13, 2013.
Office Action in Chinese Application No. 200780020255.2 dated Mar. 4, 2013.
Office Action in Chinese Application No. 200980119995.0 dated Apr. 15, 2013.
Office Action in Japanese Application No. 2011-516466 mailed Mar. 6, 2013.
Second Office Action in Chinese Application No. 200980119993.1 dated Mar. 12, 2013.
Examination Report in Singapore Application No. 201103333-9 dated Aug. 13, 2013.
Office Action in Canadian Application No. 2741895 dated Oct. 21, 2013.
Office Action in Chinese Application No. 200980119993.1 dated Oct. 21, 2013.
Office Action in Korean Application No. 10-2011-7002461 mailed May 29, 2013.
Preliminary Examination in Chinese Application No. 201180053405.6 dated May 28, 2013. English Translation Not Yet Received.
First Office Action in Chinese Application No. 200980111422.3 dated Apr. 13, 2012.
Second Office Action in Chinese Application No. 200980111426.1 mailed Dec. 25, 2013.
First Office Action in Japanese Application No. 2011-502139 dated Nov. 5, 2013.
Preliminary Examination in Chinese Application No. 201310717573.1 dated Feb. 25, 2014. English Translation Not Yet Received.
First Office Action in Japanese Application No. 2013-529454 mailed Feb. 3, 2014 in 6 pages.
First Office Action issued in Australian Application No. 2011307319 mailed Mar. 6, 2014 in 5 pages.
Office Action in Indian Application No. 3742/KOLNP/2008 dated Nov. 22, 2013.
Gunther et al, "Measuring Round Trip Times to determine the Distance between WLAN Nodes", Dec. 18, 2004, Technical University Berlin, all pages.
Examination Report in Singapore Application No. 201006874-0 dated May 16, 2012.
Second Office Action in Japanese Application No. 2011-516466 mailed Mar. 17, 2014.
Office Action in Japanese Application No. 2013-540982 dated Jun. 2, 2014 English Translation Not Yet Received.
Written Opinion in Singapore Application No. 201303521-7 dated May 20, 2014.
Office Action in Japanese Application No. 2013-123086 mailed Apr. 15, 2014 in 3 pages.
Third Office Action in Chinese Application No. 200980111426.1 mailed Jul. 7, 2014.
Decision of Rejection in Application No. 2011-502139 dated Jun. 30, 2014.
First Office Action in Japanese Application No. 2011-503091 dated Nov. 18, 2013.
Search Report and Written Opinion issued in Singapore Application No. 201006873-2 mailed on Oct. 12, 2011.
Search Report and Written Opinion in Singapore Application No. 201301573-0 mailed Jul. 1, 2014.
First Office Action is Chinese Application No. 200980125551.8 mailed Jul. 4, 2012.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=601009970, XP055153445, Mar. 24, 2008.
First Office Action in Chinese Application No. 201180046104.0 mailed Nov. 3, 2014.
Gunther et al, "Measuring Round Trip Times to determine the Distance between WLAN Nodes",May 2005, In Proc. of Networking 2005, all pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123 (no Eng Trans).
Supplementary European Search Report in Application No. 09729072.0 2266064 dated Dec. 10, 2014.
Fourth Office Action in Chinese Application No. 200980111426.1 mailed Jan. 15, 2015.
Decision of Refusal in Japanese Application No. 2011-516466 mailed Jan. 16, 2015.
Examination Report in Singapore Application No. 201301573-0 mailed Dec. 22, 2014.
Office Action in Japanese Application No. 2013-529454 dated Mar. 9, 2015 (Eng Translation Not Yet Received).
Office Action in Japanese Application No. 2013-123086 mailed Dec. 2, 2014 in 2 pages.
Office Action in Canadian Application No. 2741895 dated Feb. 25, 2013.
"Non-Final Office Action dated Jan. 3, 2012," U.S. Appl. No. 12/652,541, filed Jan. 3, 2012; 35 pages.
"Final Office Action dated Sep. 5, 2012," U.S. Appl. No. 12/652,541, filed Sep. 5, 2012; 40 pages.
"Notice of Allowance dated Jan. 4, 2013," U.S. Appl. No. 12/652,541, filed Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.

(56) References Cited

OTHER PUBLICATIONS

Armour et al.: "A Heuristic Algorithm and Simulation Approach to Relative Location of Facilities"; Management Science, vol. 9, No. 2 (Jan. 1963); pp. 294-309.

Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.

Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.

Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.

Search Report for European Application No. 09839809.2 dated May 11, 2015.

First Office Action in Chinese Application No. 201180053405.6 dated May 3, 2015.

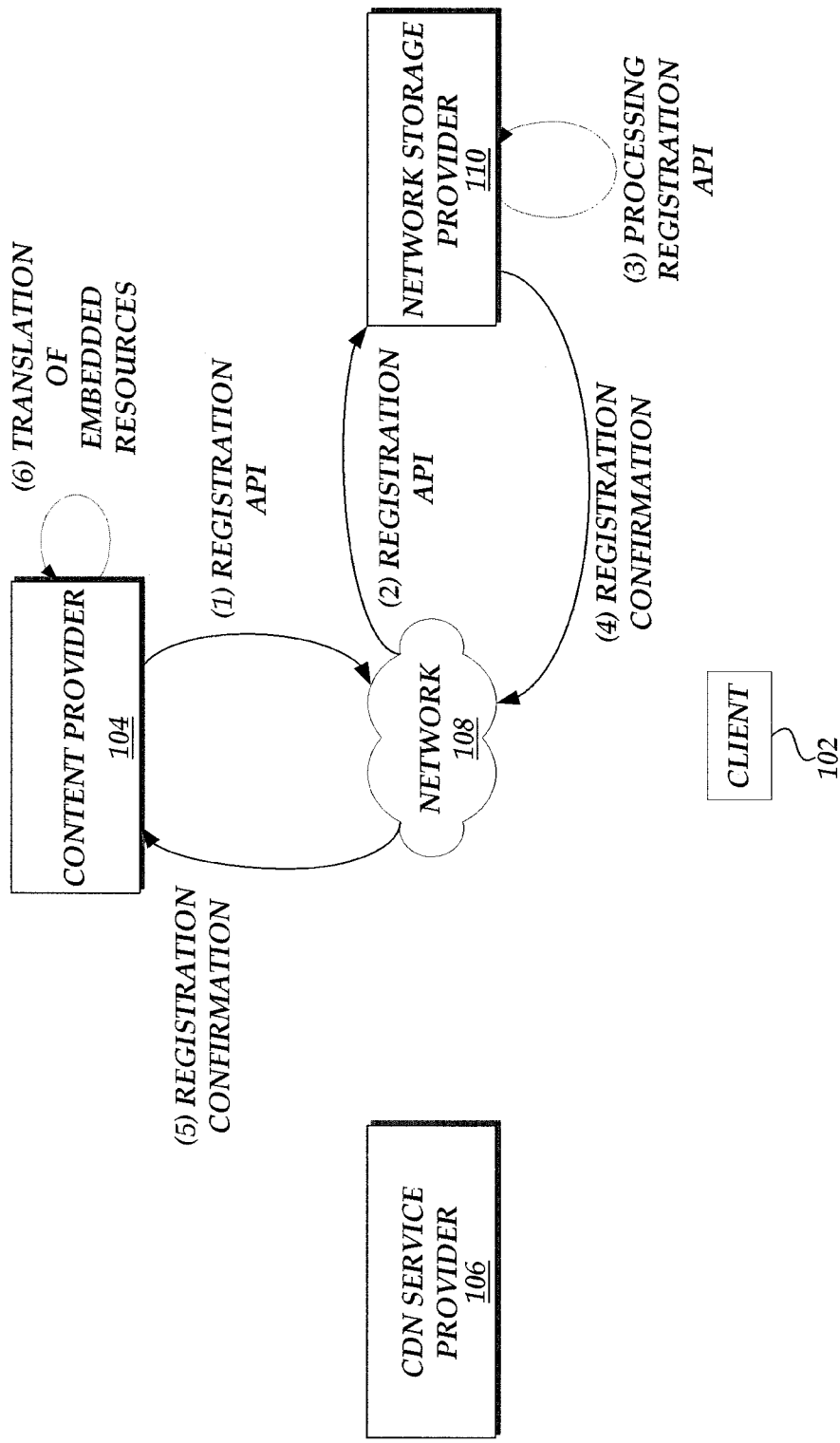

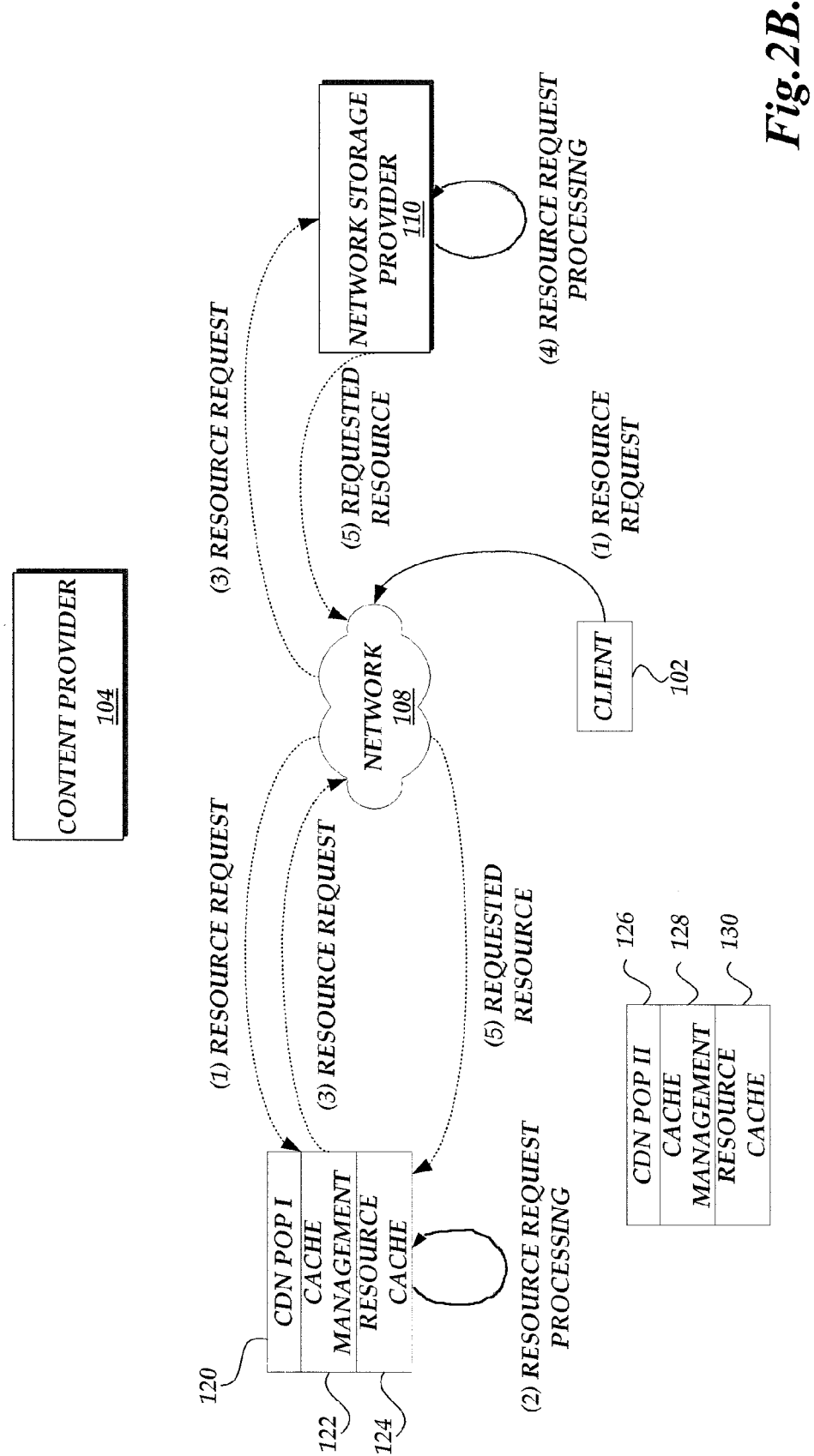

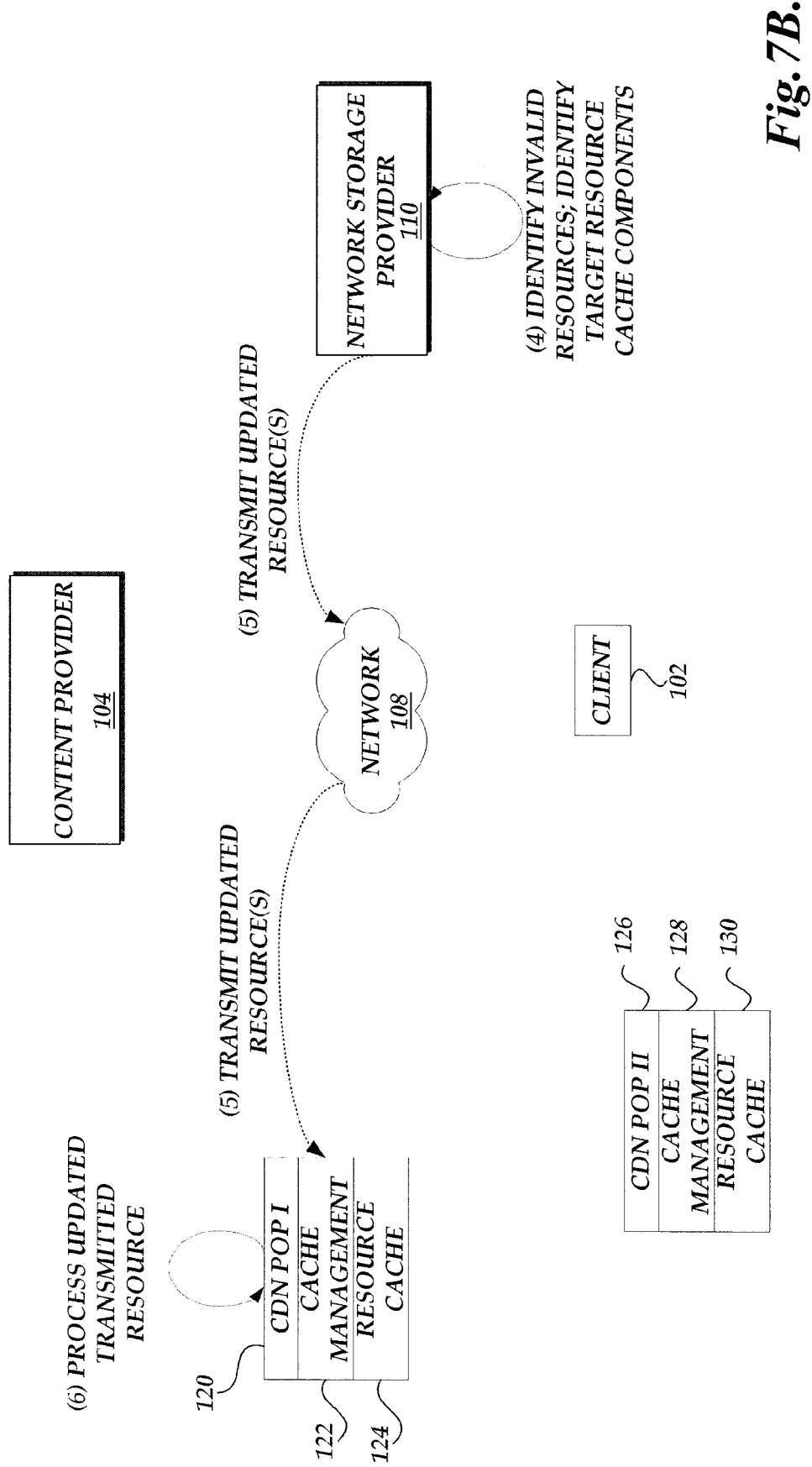

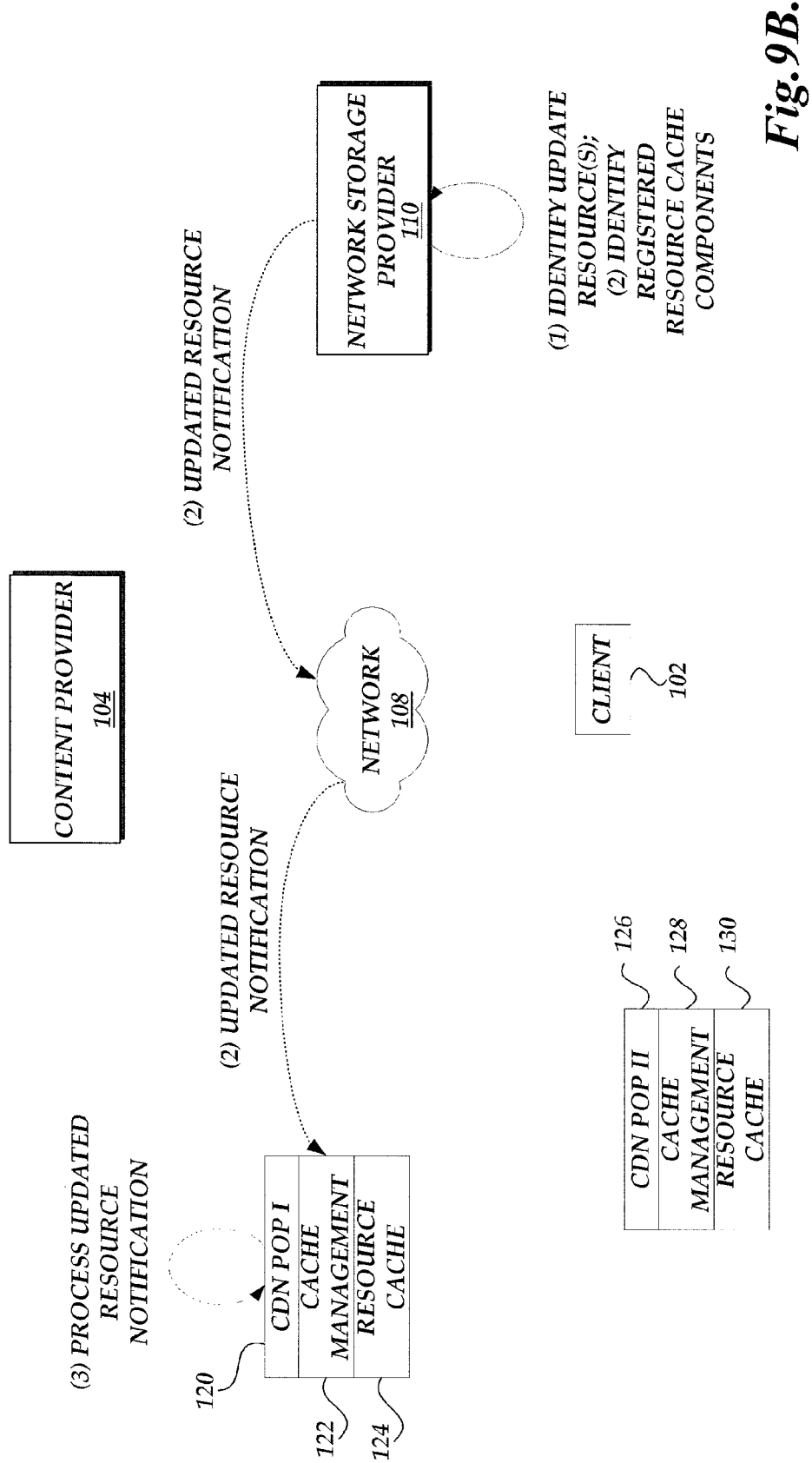

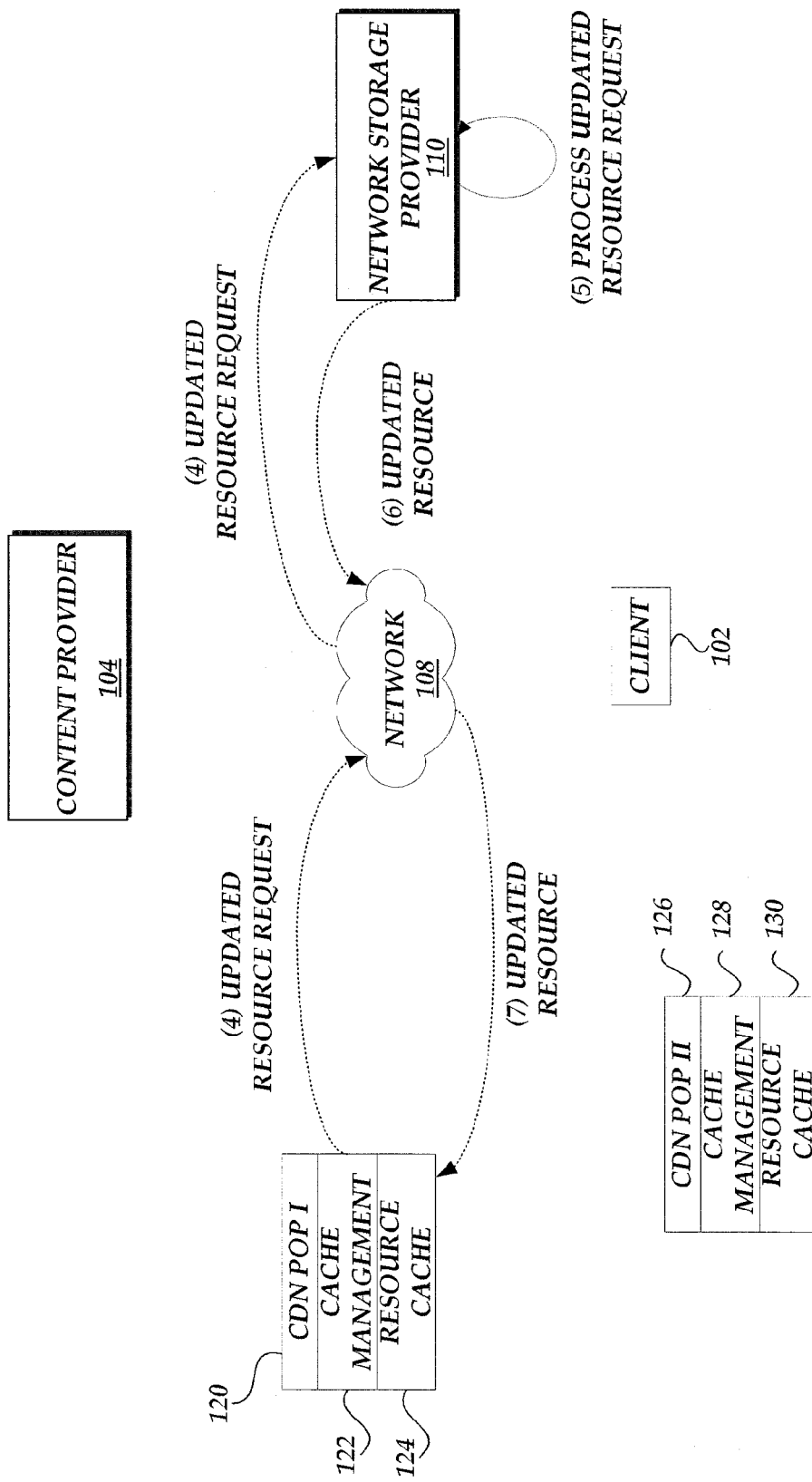

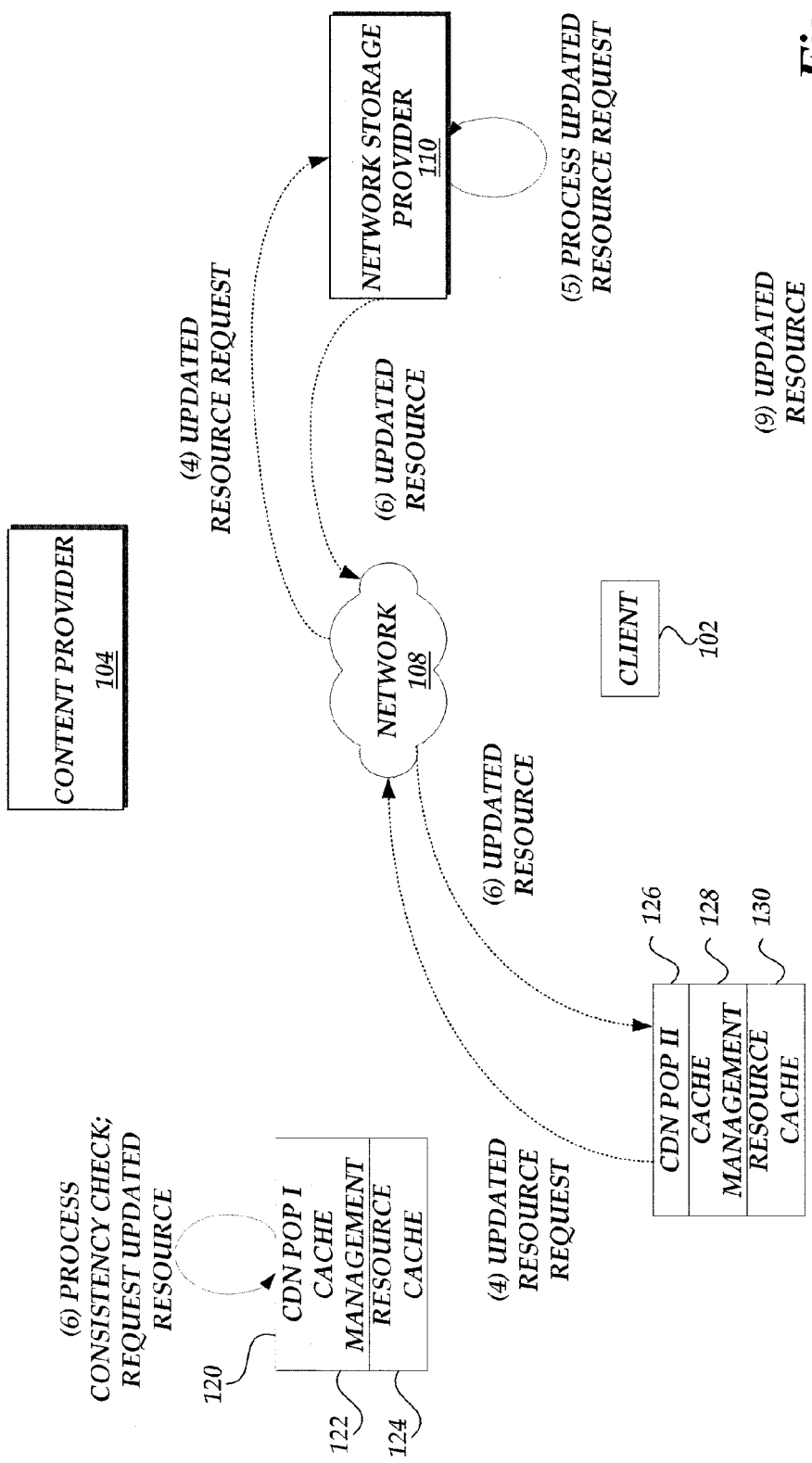

MANAGING RESOURCES IN RESOURCE CACHE COMPONENTS

CROSS-REFERENCE TO RELATED APPLICATIONS

This application is a continuation of U.S. patent application Ser. No. 12/412,443, entitled "MANAGING RESOURCES IN RESOURCE CACHE COMPONENTS" and filed Mar. 27, 2009, the disclosure of which is incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices, which can place a strain on the content provider's computing resources. Additionally, the content requested by the client computing devices may be made up of a number of distinct components (e.g., identifiable resources), which can further place additional strain on the content provider's computing resources.

With reference to an illustrative example, a requested Web page, or original content, may be associated with a number of additional resources, such as images or videos, which are to be displayed with, or as part of, the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider(s) (or any service provider on behalf of the content provider(s)) would provide client computing devices data associated with the Web page and/or the data associated with the embedded resources.

Some content providers attempt to facilitate the delivery of requested content, such as Web pages and/or resources identified in Web pages, through the utilization of a network storage provider or a content delivery network ("CDN") service provider. A network storage provider and a CDN server provider each typically maintain a number of computing devices, such as resource cache components, in a communication network that can maintain content from various content providers. In turn, content providers can instruct, or otherwise suggest to, client computing devices to request some, or all, of the content provider's content from the network storage provider's or CDN service provider's computing devices.

In some scenarios, resources that have been provided to storage service providers or CDN providers can be updated by the content provider (or other party) or otherwise are considered by the content provider to no longer be valid. In such scenarios, storage providers and CDN service providers receive the updated resource (or notification of an invalid resource) and manage each of the cache server components that are distributing the previously provided version of the resource. Because of the distributed nature of content providers, storage service providers, and CDN service providers, CDN service providers are often required to implement some type of functionality to manage the invalidation of previously provided resources with updated resources. In one embodiment, resource cache components can associate a time to refresh with the resources maintained at the resource cache components. Upon expiration of the time to refresh, the resource cache component requests the resource from the origin source (e.g., a content provider or a network storage provider) and replaces the previous version of the resource with an updated version of the resource or otherwise resets the time to refresh parameters. However, management of resources utilizing time to refresh parameters can be inefficient. In one aspect, associating shorter time to refresh parameters to resources can become burdensome by the increased frequency of update requests transmitted by the resource cache components. In another aspect, associating longer time to refresh parameters can increase the likelihood that the resource cache components continue to distribute invalid, expired or incorrect resources before obtaining the updated resources from the origin source.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 2A and 2B are block diagrams of the content delivery environment of FIG. 1 illustrating the registration of a content provider with a network storage provider and the processing of resource requests from a client computing device;

FIGS. 7A and 7B are block diagrams of the content delivery environment of FIG. 1 illustrating the management of resources by a CDN service provider and a network storage provider;

FIGS. 9A-9E are block diagrams of the content delivery environment of FIG. 1 illustrating the management of resources by a CDN service provider and a network storage provider.

DETAILED DESCRIPTION

Generally described, the present disclosure is directed to managing of content, such as resources, maintained and provided by content delivery network ("CDN") service providers. Specifically, aspects of the disclosure will be described with regard to the management of content stored by CDN service providers in one or more resource cache component to facilitate the invalidation of specific resources. In a specific embodiment, a network storage provider serves as the origin source, or origin server, of the resources maintained in the resource cache components of the CDN service provider. Accordingly, various embodiments will be described related to the management of resources maintained in the resource cache components of a CDN server provider upon the receipt of updated resource, or the updating of resources, by a network storage component.

Although the present disclosure will be described with regard to illustrative examples and embodiments, one skilled in the art will appreciate that the disclosed embodiments and examples should not be construed as limiting. Further, although the present disclosure will be described with relation to both CDN service providers and network storage providers, one skilled in the relevant art will appreciate that the present disclosure may be implemented by different entities or less than all the identified entities. Still further, various embodiments will be described for the management of resources. The various embodiments may be practiced in combination or individually and the embodiments should not be construed as requiring any particular combination or excluding any combination unless specifically identified in the disclosure.

Figure 1:
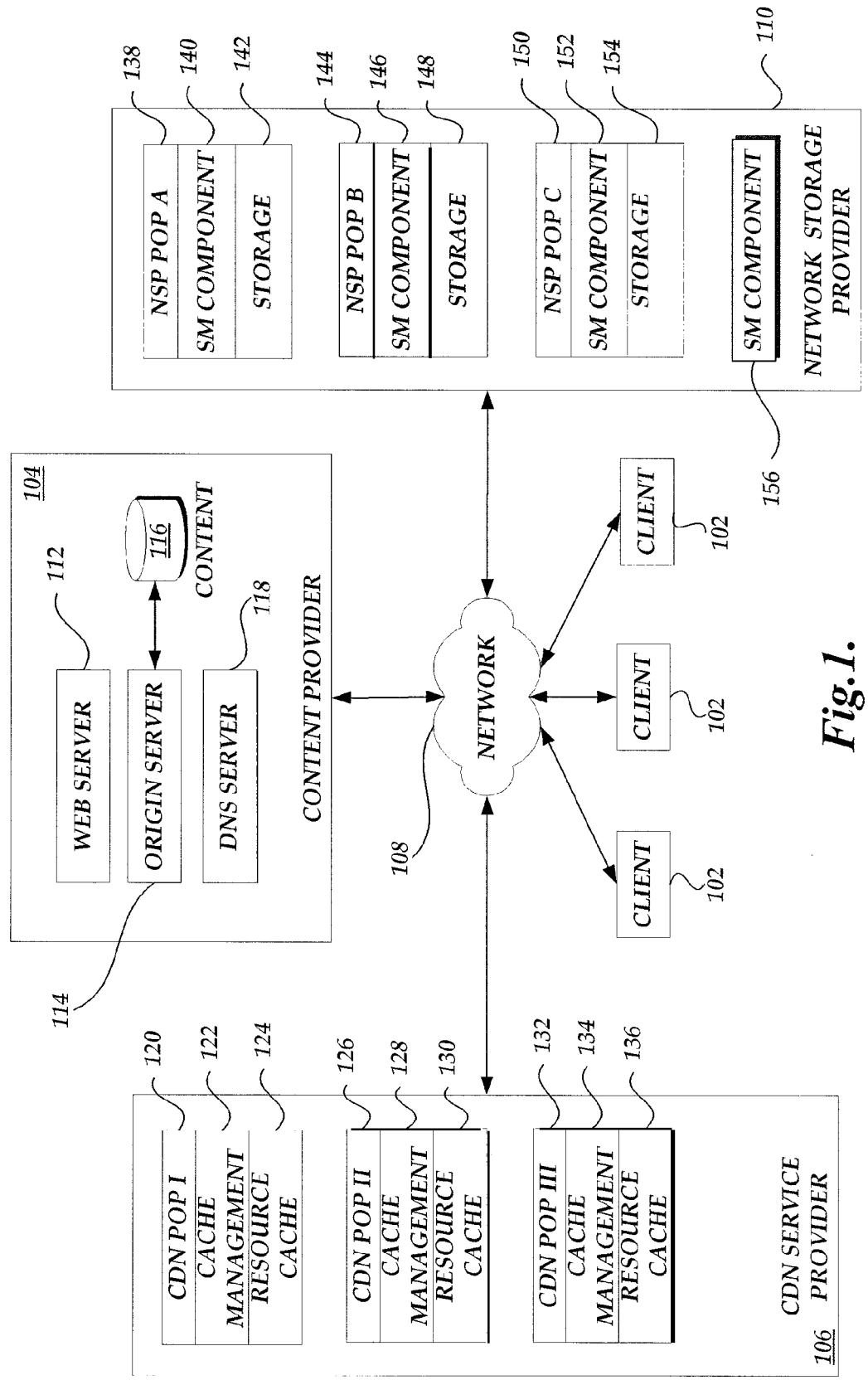
FIG. 1 is a block diagram illustrative of content delivery environment including a number of client computing devices, content provider, a network storage provider, and a content delivery network service provider.

FIG. 1 is a block diagram illustrative of content delivery environment 100 for the managing registration of content with a CDN service provider and subsequent processing of content requests. As illustrated in FIG. 1, the content delivery environment 100 includes a number of client computing devices 102 (generally referred to as clients) for requesting content from a content provider, a network storage provider 110, and/or a CDN service provider 106. The client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. Additionally, although not illustrated in FIG. 1, each client computing device 102 utilizes some type of local DNS resolver component, such as a DNS nameserver, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources, DNS nameservers, and the like. For example, as further illustrated in FIG. 1, the content provider 104 can be associated with one or more DNS nameserver components 118 that would receive DNS queries associated with the domain of the content provider 104 and be authoritative to resolve client computing device DNS queries corresponding to a domain of the content provider 104 (e.g., return an IP address responsive to the DNS query). A DNS nameserver component is considered to be authoritative to a DNS query if the DNS nameserver can completely resolve the query by providing a responsive IP address.

With continued reference to FIG. 1, the content delivery environment 100 can further include a CDN service provider 106 in communication with the one or more client computing devices 102, the content provider 104, and the network storage provider 110 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 120, 126, 132 that correspond to nodes on the communication network 108. Each POP 120, 126, 132 includes a content management component 122, 128, 134 for managing resources provided by the content provider 104 or network storage provider as will be described below. Each POP 120, 126, 132 also includes a resource cache component 124, 130, 136 made up of a number of cache server computing devices for storing resources from content providers or network storage providers and transmitting various requested resources to various client computers. Although not illustrated, each POP can also include additional hardware and software component for facilitating the processing of resource requests from client, such as DNS components for processing DNS queries and load balancing or load sharing software/hardware components for managing resource requests.

In an illustrative embodiment, the content management component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, client request distribution process, and the like.

With further continued reference to FIG. 1, the content delivery environment 100 can also include a network storage provider 110 in communication with the one or more client computing devices 102, the CDN service provider 106, and the content provider 104 via the communication network 108. The network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 144, 150 that correspond to nodes on the communication network 108. In some embodiments, the NSP POP 138, 144, 150 can include a storage management ("SM") component 140, 146, 152 for processing resource cache component consistency check requests, transmitting update information to the resource cache components, distributing resources to various resource cache components, or processing registrations for resources provided by resource cache components. The functionality implemented by the SM components 140, 146, 152 may vary according to the content management functionality implemented by the storage service provider 110 or the CDN service provider 106.

Each NSP POP 138, 144, 150 also includes a storage component 142, 148, 154 made up of a number of storage devices for storing resources from content providers which will be processed by the network storage provider 110 and transmitted to various client computers. The storage components 142, 148, 154 may further include additional software and/or hardware components that facilitate communications including, but not limited to, load balancing or load sharing software/hardware components. In an illustrative embodiment, the storage components 142, 148, 154 are considered to be logically grouped, regardless of whether the components, or portions of the components, are physically separate. Additionally, the network storage provider 110 may include a stand alone SM component 156 that provides CDN service provider recommendations to content providers 104, such as via a Web service.

Additionally, although the NSP POPs 138, 144, 150 are illustrated in FIG. 1 as logically associated with the network storage provider 110, the NSP POPs will be geographically distributed throughout the communication network 108 in a manner to best serve various demographics of client computing devices 102. Additionally, the network storage provider 110 can be associated with various additional computing resources, such additional computing devices for administration of content and resources, DNS nameservers, and the like. For example, the network storage provider 110 can be associated with one or more DNS nameserver components that are operative to receive DNS queries related to registered domain names associated with the network storage provider 110. The one or more DNS nameservers can be authoritative to resolve client computing device DNS queries corresponding to the registered domain names of the network storage provider 110. As similarly set forth above, a DNS nameserver component is considered to be authoritative to a DNS query if the DNS nameserver can resolve the query by providing a responsive IP address. Even further, the components of the network storage provider 110 and components of the CDN service provider 106 can be managed by the same or different entities.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-6, an embodiment illustrating the interaction between various components of the content delivery environment 100 of FIG. 1 will be described. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2A, an illustrative interaction for registration of a content provider 104 with the network storage provider 110 will be described. As illustrated in FIG. 2A, the storage provider content registration process begins with registration of the content provider 104 with the network storage provider 110. In an illustrative embodiment, the content provider 104 utilizes a registration application program interface ("API") to register with the network storage provider 110 such that the network storage provider 119 can provide content on behalf of the content provider 104. The registration API includes the identification of the origin server 114 of the content provider 104 that will provide requested resources to the network storage provider 110. In addition or alternatively, the registration API includes the content to be stored by the network storage provider 110 on behalf of the content provider 104.

One skilled in the relevant art will appreciate that upon storage of the content by the network storage provider 110, the content provider 104 can begin to direct requests for content from client computing devices 102 to the network storage provider 110. Specifically, in accordance with DNS routing principles, a client computing device DNS request corresponding to a resource identifier would eventually be directed toward a storage component 140, 144, 148 of a NSP POP 138, 142, 146 associated with the network storage provider 110 (e.g., resolved to an IP address corresponding to a storage component).

In an illustrative embodiment, upon receiving the registration API, the network storage provider 110 obtains and processes the content provider registration information. In an illustrative embodiment, the network storage provider 110 can then generate additional information that will be used by the client computing devices 102 as part of the content requests. The additional information can include, without limitation, content provider identifiers, such as content provider identification codes, storage provider identifiers, such as storage provider identification codes, executable code for processing resource identifiers, such as script-based instructions, and the like. One skilled in the relevant art will appreciate that various types of additional information may be generated by the network storage provider 110 and that the additional information may be embodied in any one of a variety of formats.

The network storage provider 110 returns an identification of applicable domains for the network storage provider (unless it has been previously provided) and any additional information to the content provider 104. In turn, the content provider 104 can then process the stored content with content provider specific information. In one example, the content provider 104 translates resource identifiers originally directed toward a domain of the origin server 114 to a domain corresponding to the network storage provider 110. The modified URLs are embedded into requested content in a manner such that DNS queries for the modified URLs are received by a DNS nameserver corresponding to the network storage provider 110 and not a DNS server corresponding to the content provider 104.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the modified URLs resolve to a POP associated with the network storage provider 110. In one embodiment, the modified URL identifies the domain of the network storage provider 110 (e.g., "storageprovider.com"), the same name of the resource to be requested (e.g., "resource.xxx") and the same path where the resource will be found (e.g., "path"). Additionally, the modified URL can include additional processing information (e.g., "additional information"). The modified URL would have the form of:

http://additional information.storageprovider.com/path/resource.xxx

In another embodiment, the information associated with the network storage provider 110 is included in the modified URL, such as through prepending or other techniques, such that the modified URL can maintain all of the information associated with the original URL. In this embodiment, the modified URL would have the form of:

http://additional information.storageprovider.com/www.contentprovider.com/path/resource.xxx After completion of the registration and translation processes illustrated in FIG. 2A, a client computing device 102 subsequently generates a content request that is received and processed by the content provider 104, such as through the Web server 112. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers will generally in the form of the modified URLs, described above.

With reference now to FIG. 2B, upon receipt of the requested content, the client computing device 102, such as through a browser software application, begins processing any of the markup code included in the content and attempts to acquire the resources identified by the embedded resource identifiers (e.g., the embedded, modified URLs). Although not illustrated in FIG. 2B (or will be described in detail), the acquisition of the identified resources begins with the issuance of DNS queries by the client computing device 102 that are resolved by identifying an IP address corresponding to a CDN service provider POP that will attempt to provide the subsequently requested content. For purposes of illustration in FIG. 2B, it is assumed that the client computing device 102 has been provided the IP address of POP I 120. Accordingly, the client computing device 102 can begin issuing content requests, such as requests corresponding to the hypertext transfer protocol ("HTTP"), to POP I 120, which in turn are processed by the resource cache component 124. If a requested resource is maintained by the resource cache component 124, the resource cache component can provide the requested resource to the client computing device 102.

Alternatively, if the resource cache component 124 does not maintain the requested resource, as illustrated in FIG. 2B, the resource cache component transmits a resource request to the origin source identified in the resource request, such as in a URL corresponding to the resource request or via information maintained by the resource cache component. For purposes of illustration, it is assume that storage service provider 110 operates as the origin source, or origin server, for the requested resource on behalf of the content provider 104. The storage service provider 110, or NSP POP, processes the resource request and provides the requesting resource cache component with the requested resource. The resource cache component 124 can then provide the client computing device 102 with the requested resource. Additionally, the resource cache component 124 can maintain, or cache, the requested resource for processing subsequent requests for the resource without requiring the resource cache component to request the resource from the storage service provider 110.

Figure 3A:
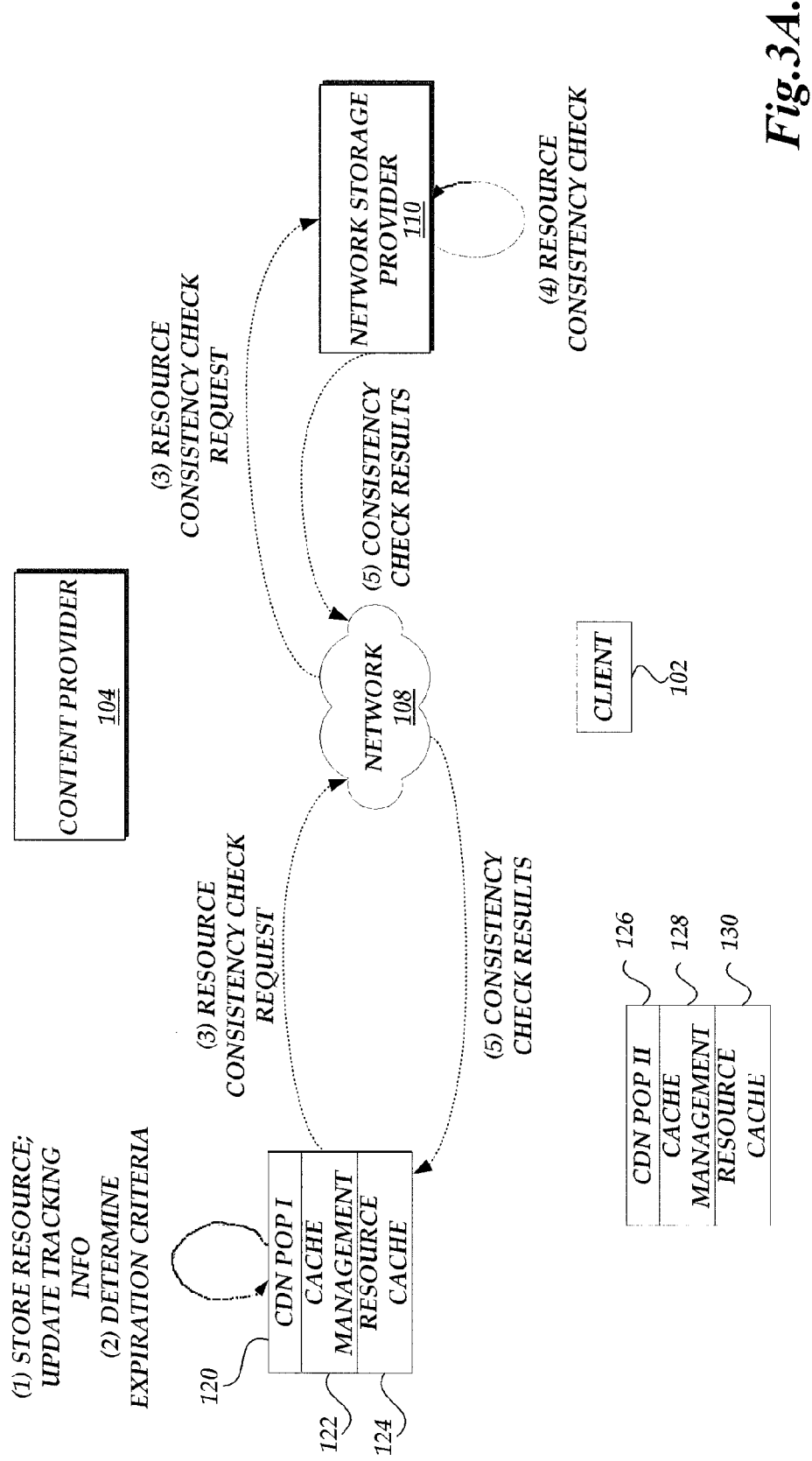
FIGS. 3A and 3B are block diagrams of the content delivery environment of FIG. 1 illustrating the management of resources by a CDN service provider.
Figure 3B:
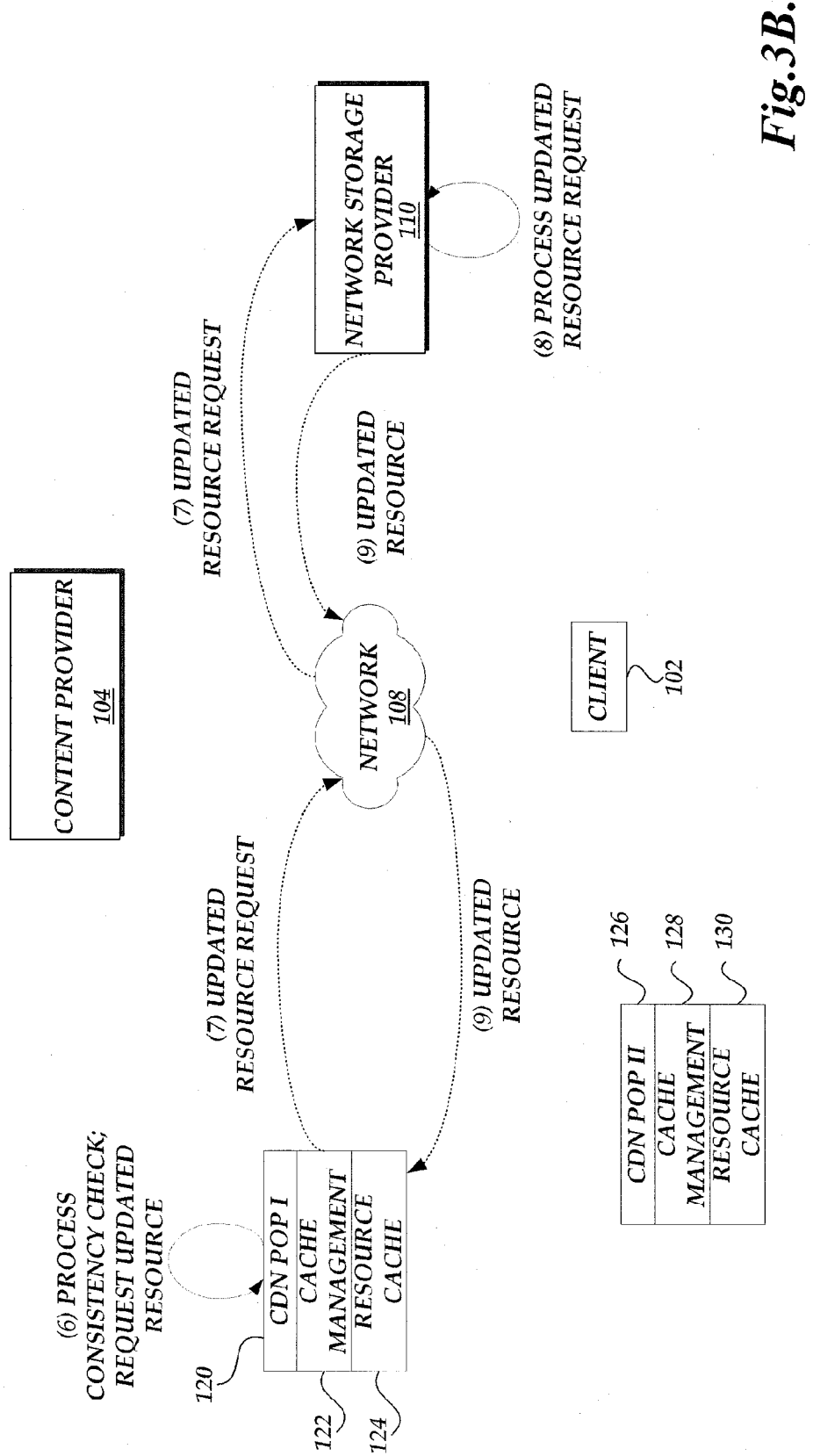

Turning now to FIGS. 3A and 3B, an embodiment for the management of resources provided by the network storage provider 110 will be described. With reference to FIG. 3A, after receipt of the resource from the network storage provider 110 (FIG. 2B), the resource cache component 124 stores the resource and makes the resource available to delivery to any client subsequently requesting the resource. Additionally, the cache management component 122 updates tracking information associated with resources maintained in the resource cache component 124. In an illustrative embodiment, the tracking information can correspond to an inode data structure. One skilled in the relevant art will appreciate that an inode data structure corresponds to a data structure utilized to store information about an object, such as file or resource. Such information can be referred to as metadata. Each resource is associated with an inode number that uniquely corresponds to the resource (or a grouping of resources) among other resources maintained in the resource cache component. The cache management component maintains inode numbers in which the information about a resource can be accessed by reference to its corresponding inode number. For example, the inode numbers can be maintained in a table or an array format. In another example, the inode numbers can be maintained in a tree structure format, such as a radix tree or Patricia Trie.

In this illustrative embodiment, the information associated with each inode corresponds to expiration criteria, the satisfaction of which is indicative that the inode can no longer be considered valid. Examples of expiration can include, but are not limited to, a time of day, a total time expired since storing the resource (or refreshing a count), occurrence of other identifiable events, and the like. The expiration data may be specified by the cache management component 122 as the resource is received. Additionally, the expiration data may also be specified, at least in part, by the network storage provider 110. Further, the expiration data may be dynamically updated by the cache management component 122 or network storage provider (or other component) based on communication network bandwidth, a number of pending requests received by the network storage provider 110, a number of requests being transmitted by the cache management component 122, and the like.

As illustrated in FIG. 3A, based on monitoring and analyzing expiration criteria and determining that the expiration criteria has been satisfied, the cache management component 122 can transmit a consistency check request to the network storage provider 110. In an illustrative embodiment, the consistency check request corresponds to a request to determine whether invalidity information maintained by the network storage provider 110 is indicative that the corresponding resource should be invalidated.

In a specific embodiment, the network storage provider maintains invalidity information identifying resource validity. The network storage provider 110 transmits the results of the consistency check to the cache management component 122. The results of the consistency check can include information indicating that the inode is no longer valid. Additionally, or alternatively, the results of the consistency check can include information that is processed by the cache management component 122 to determine whether the inode is valid. For example, the results of the consistency check can correspond to blocks of data used to update the information stored in the inode data structure. Accordingly, a determination of whether the information identifying the inode as valid or invalid would not be available until after the processing and incorporation of such update information.

With reference now to FIG. 3B, the cache management component 122 processes the consistency check information to determine whether the inode is to be considered valid or invalid. If the inode is considered to be valid, the cache management component 122 does not need to perform additional activity with regard to the requested resource. Accordingly, the cache management component 122 can either rest the expiration criteria or otherwise obtain, or generate, updated expiration criteria. Alternatively, if the inode is determined to be invalid, the cache management component 122 determines that the corresponding resource, or set of resources, is also invalid. Accordingly, as illustrated in FIG. 3B, the cache management component transmits a request for an updated resource. The request can then be processed by the network storage component, which provides the updated resource, or set of resources. The resource management component can then process the incoming updated resources in a manner as described with regard to FIG. 2A.

Figure 4A:
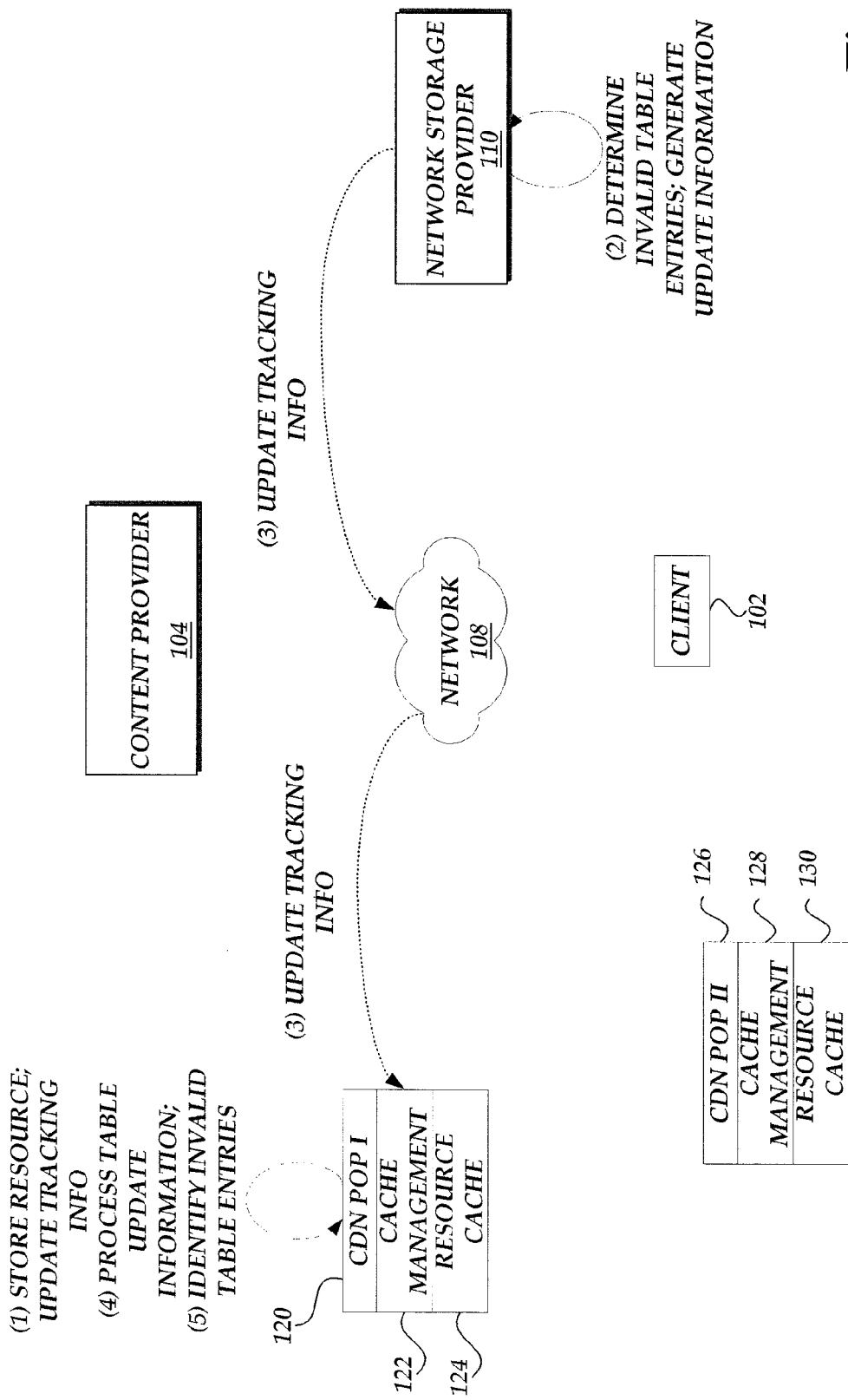
FIGS. 4A and 4B are block diagrams of the content delivery environment of FIG. 1 illustrating the management of resources by a CDN service provider.
Figure 4B:
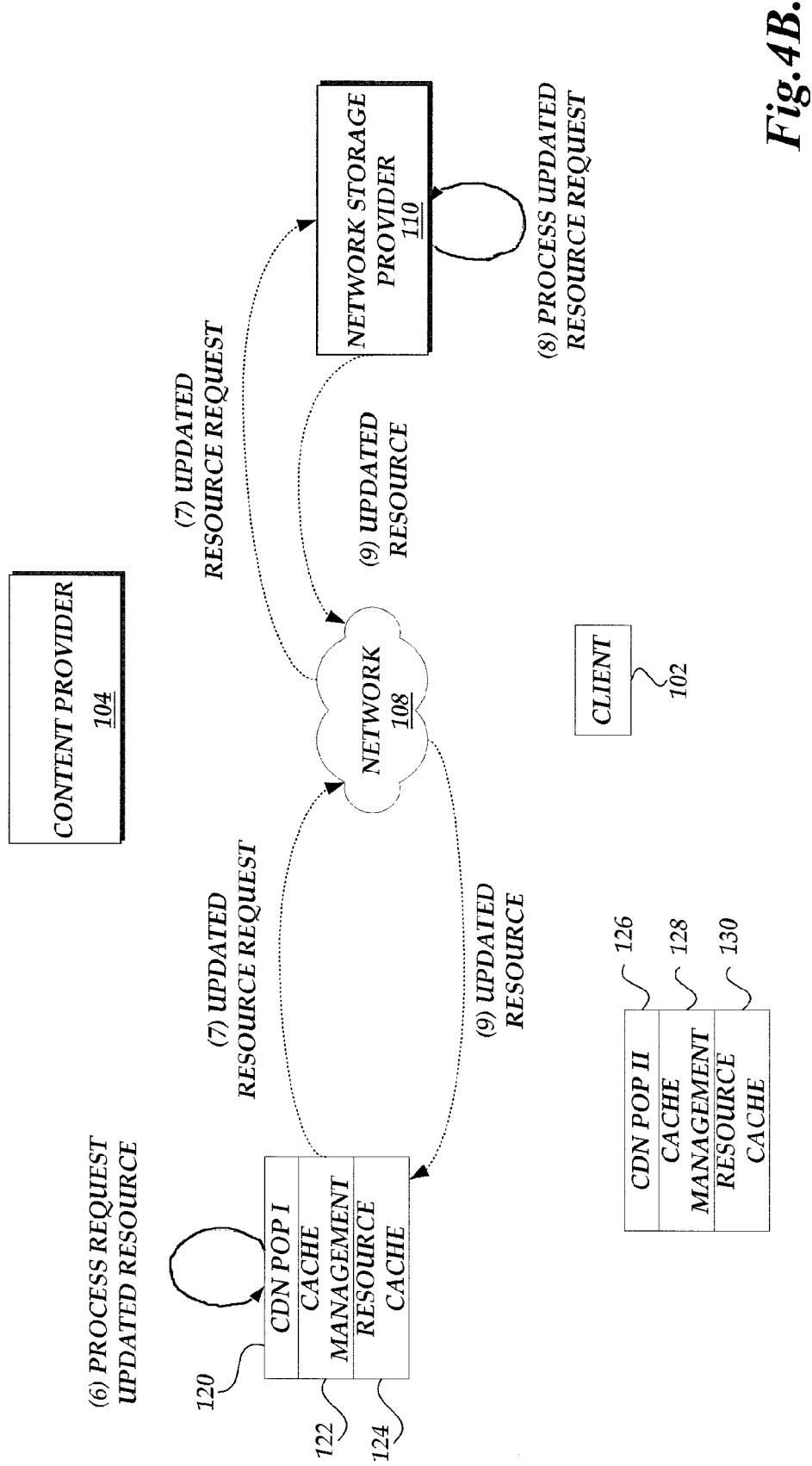

Turning now to FIGS. 4A and 4B, an embodiment for the management of resources provided by the network storage provider 110 will be described. Similar to the interaction described with regard to FIG. 3A, as illustrated in FIG. 4A, after receipt of the resource from the network storage provider 110 (FIG. 2B), the resource cache component 124 stores the resource and makes the resource available to delivery to any client subsequently requesting the resource. Additionally, the cache management component 122 updates tracking information associated with resources maintained in the resource cache component 124. As also previously described with regard to FIG. 3A, the tracking information can correspond to an inode data structure organized such that the cache management component 122 maintains inode numbers for stored resources. Additionally, the cache management component 122 maintains the inode information in a tree structure format, such as a radix tree or Patricia Trie.

As illustrated in FIG. 4A, upon the determination that one or more resources are invalid, the network storage provider 110 updates an index, or other mapping, of the inodes. Specifically, the network storage provider 110 identifies that inodes corresponding to resources that are invalid or otherwise need to be updated, generally referred to as the update information. The storage network provider then transmits the update information to the cache management component 122. Upon receipt, the cache management component 122 can process the update information and utilize the tree structure format, such as the radix tree or Patricia Trie, identify invalid inodes.

With reference now to FIG. 4B, the cache management component 122 can utilize the inode information to process the resources maintained in the resource cache component 124. If the inode is considered to be valid, the cache management component 122 does not need to perform additional activity with regard to the requested resource. Accordingly, the cache management component 122 can either rest the expiration criteria or otherwise obtain, or generate, updated expiration criteria. Alternatively, if the inode is determined to be invalid, the cache management component 122 determines that the corresponding resource, or set of resources, is also invalid. Accordingly, in one embodiment illustrated in FIG. 4B, the cache management component transmits a request for an updated resource. The request can then be processed by the network storage component, which provides the updated resource, or set of resources. The resource management component can then process the incoming updated resources in a manner as described with regard to FIG. 2A. Alternatively, the cache management component 122 can process the determination of invalidity of the inode without transmitting the request for the updated resource.

Figure 5A:
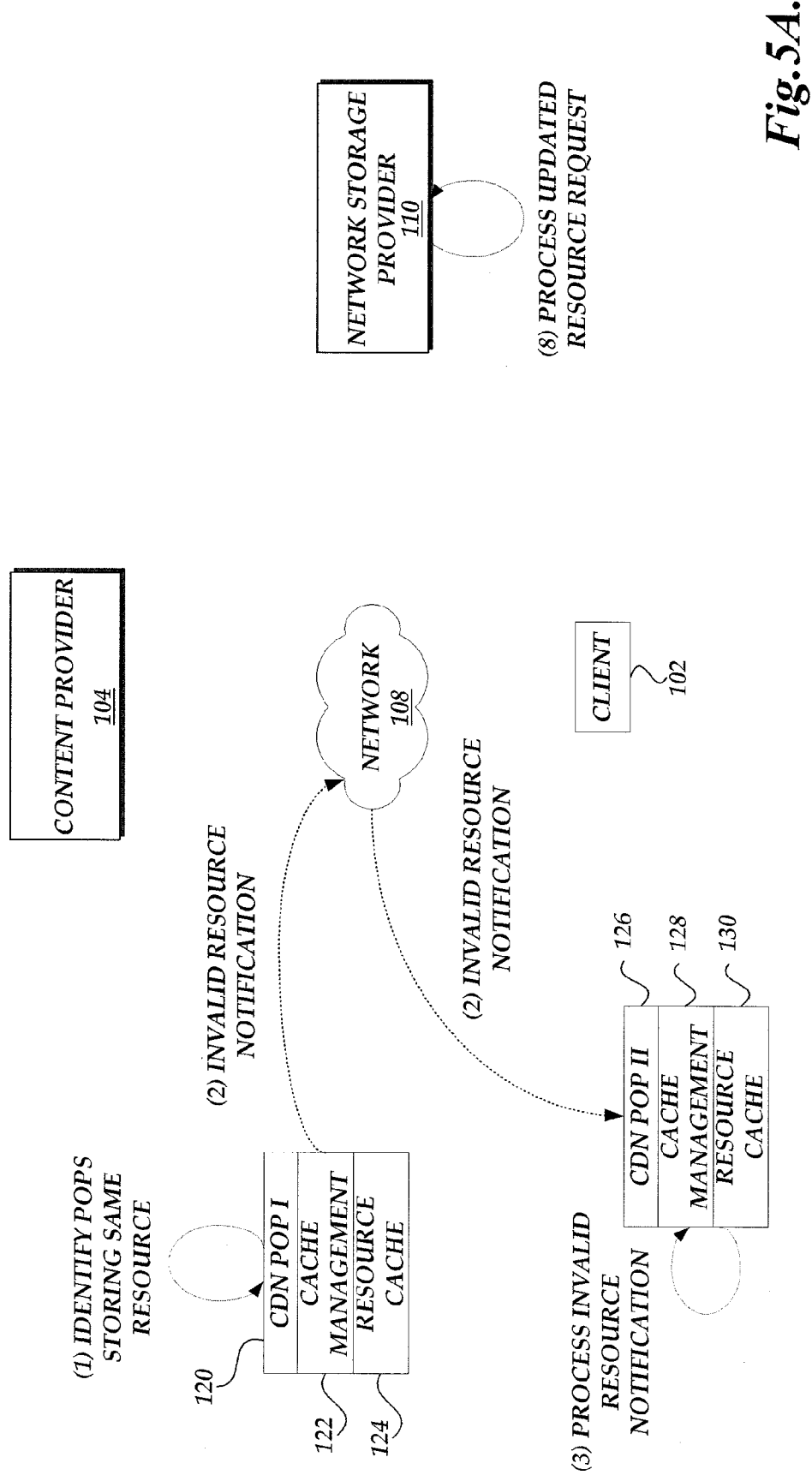
FIGS. 5A and 5B are block diagrams of the content delivery environment of FIG. 1 illustrating the management of resources by a CDN service provider.
Figure 5B:
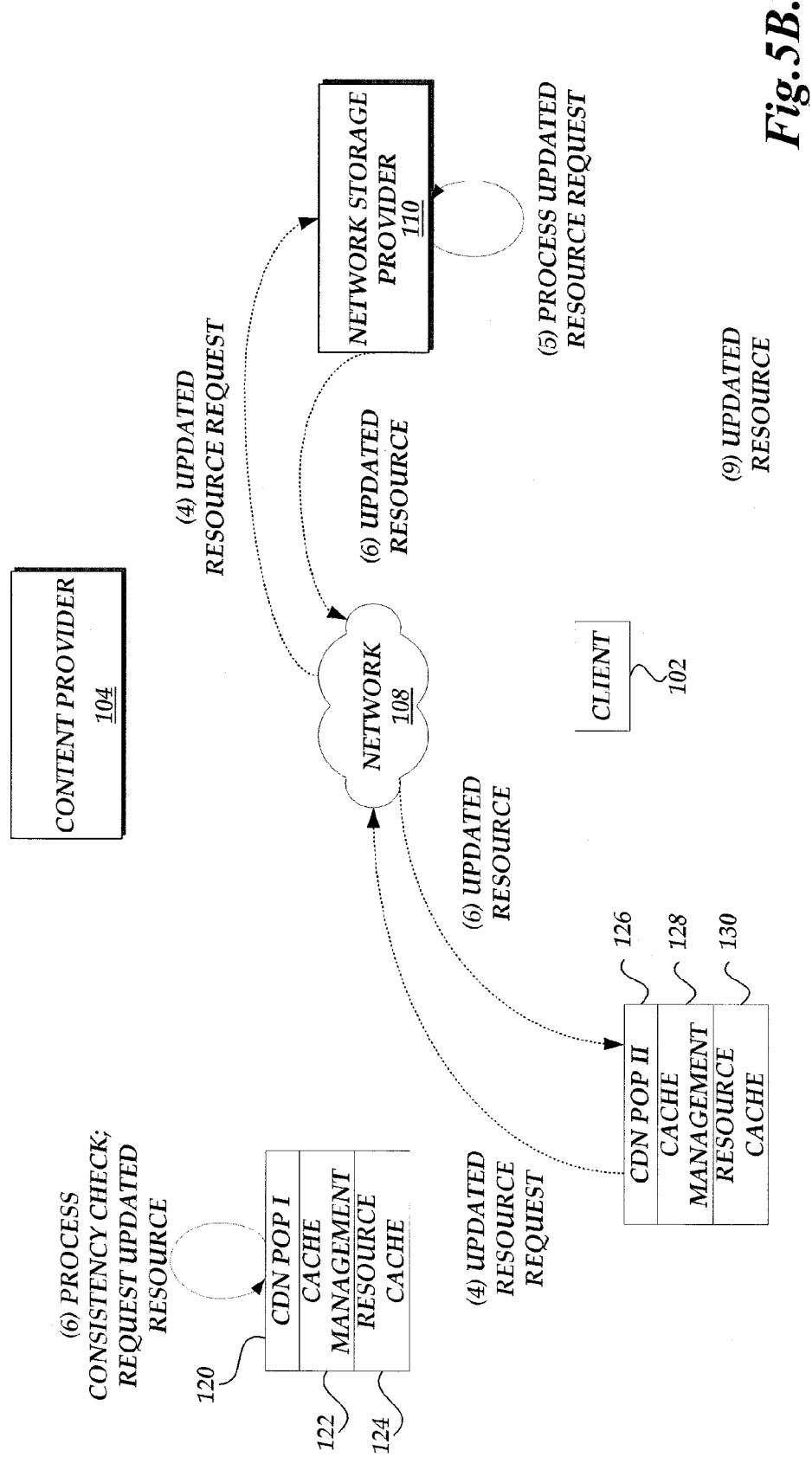

With reference now to FIGS. 5A and 5B, in one embodiment, the cache management component 122 can also be utilized to further distribute information regarding the invalidation of inodes. The interaction described with regard to FIGS. 5A and 5B can be implemented in conjunction with either the interaction described with regard to FIGS. 3A and 3B, FIGS. 4A and 4B, or any other interaction in which inodes are identified as invalid (or the corresponding resource). With reference to FIG. 5A, in an illustrative embodiment, the inode data structure can be utilized to identify other resource cache components that may also be maintained the previous version of the resource that has been identified as invalid. Accordingly, the cache management component 122 utilizes the information stored in the inode data structure to identify one or more resource cache components that have the resource. In an illustrative embodiment, the CDN service provider 106 may maintain master lists or partial master lists of commonly maintained resources among the various POPs. For example, the CDN service provider 106 may facilitate the synchronization of inode information across multiple cache management components. Additionally, or alternatively, the various cache management components may utilize peer-to-peer distribution techniques to exchange information related to inode information. For example, the cache management components may implement a Gossip protocol, or other communication protocol, for the distribution of information across a distributed network, such as the network of POPs associated with the CDN service provider 106. As illustrated in FIG. 5A, cache management component 122 utilizes the information maintained in the inode data structure to transmit invalid resource notifications to other cache management components 128. Although only a single transmission is illustrated, one skilled in the relevant art will appreciate that a single cache management component can transmit multiple invalid resource notifications or utilize one of various peer-to-peer distribution models.

With reference now to FIG. 5B, the receiving cache management component 128 can then component transmits a request for an updated resource. The request can then be processed by the network storage component, which provides the updated resource, or set of resources. The resource management component 128 can then process the incoming updated resources in a manner as described with regard to FIG. 2A. Alternatively, the cache management component 128 may be configured in a manner such that updates are received from the network storage provider 110 only by a designated resource cache component 122. In this embodiment, the cache management component 128 would not need to update any inode information.

With reference now to FIGS. 6A-6D, illustrative flow diagram related to the management of resources in a resource cache component will be described. The various routines will be described with regard to implementation by a cache management component or resource cache component. It will be appreciate that both the cache management component and resource cache component logically correspond to a POP provided by a CDN service provider 106. Accordingly, any particular functionality associated with one of the components could be implemented by the other component, by multiple components or by another component associated with a POP or any component distributed across a communication network 108. Further, although the various routines will be described as being implemented by an illustrative cache management component, the present disclosure should not be construed as requiring a resource cache component to implement all, of specific subsets, of the routines illustrated in FIGS. 6A-6D.

Figure 6A:
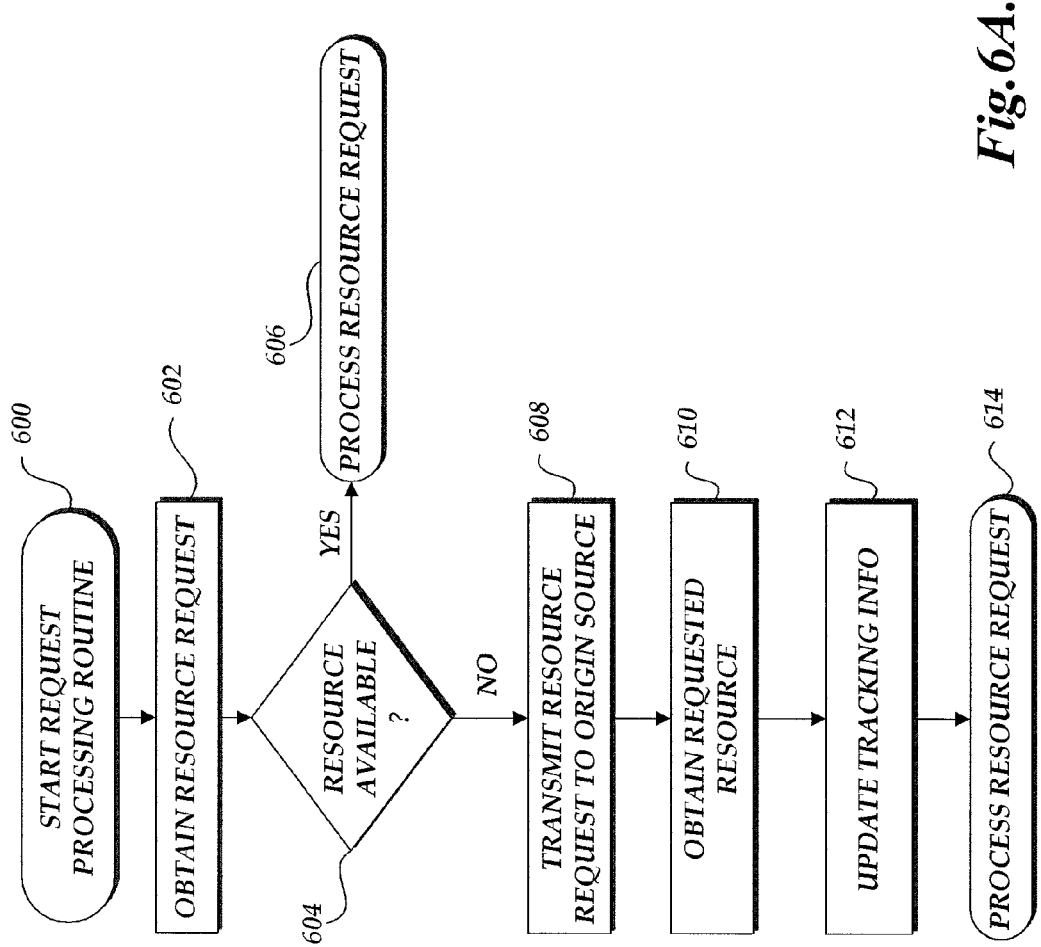
FIGS. 6A-6D are flow diagrams illustrative of various routines implemented by a CDN service provider for management of resources.

With reference to FIG. 6A, a request processing routine 600 implemented by a cache management component will be described. At block 602, the cache management component obtains a resource request. In an illustrative embodiment, the resource request can be transmitted by a client computing device 102. As previously described, the resource request may correspond to a set of resources, such as from a Web page. At decision block 604, a test is conducted to determine whether the requested resource is available at the resource cache component. A determination of whether the resource is available can correspond to a determination of whether a matching resource is currently stored and accessible. Additionally, if the requested resource is stored and accessible, the determination can further include a determination of whether the resource remains valid (such as by timestamp). If so, the resource request is processed at block 600 by transmitting the requested resource to the client device 102.

Alternatively, if the requested resource is not available at the resource cache component, at block 608, the resource cache component (or cache management component) transmits a request for the resource from an origin source. In an illustrative embodiment, the origin source can include other resource cache components provide by the CDN service provider 106. Additionally, the origin source can correspond to one or more NSP POPs provided by a network storage provider 110. Still further, the origin source can correspond to one or more storage locations provided by, otherwise associated with, a content provider 104. At block 610, the resource cache component obtains the requested resource from the origin source. At block 612, the cache management component updates the tracking information utilized to manage the resources stored in the resource cache component. As previously described, the tracking information can be captured by the incorporation of an inode data structure in which one or more resources are represented by an inode number. In an illustrative embodiment, the information maintained in the inode data structure can be provided by the network storage provider 110, generated, or otherwise determined, by the cache management component, or obtained from another source. At block 614, the resource request is processed at block 600 by transmitting the requested resource to the client device 102. The routine 600 terminates.

Figure 6B:
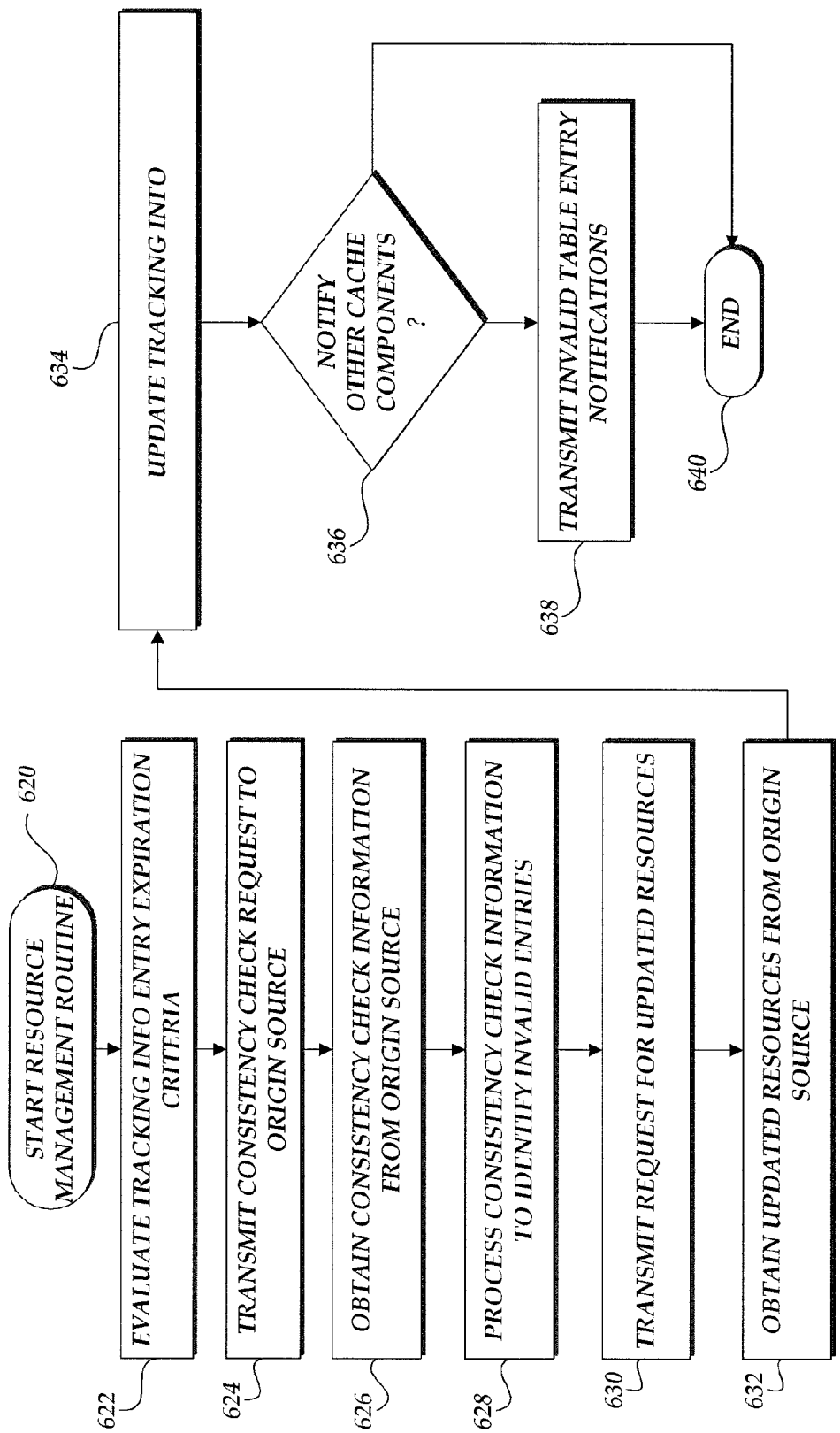

With reference now to FIG. 6B, a resource management routine 620 implemented by a cache management component will be described. In an illustrative embodiment, routine 620 can be utilized to manage resources utilizing tracking information, such as an inode data structure, that includes expiration criteria in a manner illustrated with regard to FIGS. 3A and 3B. At block 622, the cache management component evaluates tracking information expiration criteria. In an illustrative embodiment, the evaluation of the tracking information will depend on the type of expiration criteria, such as timestamps, total time or inferential references. Based on a determination that the expiration criteria have been satisfied for at least one inode, at block 624, the cache management component transmits a consistency check request to the origin source, such as the network storage provider 110. As previously described, in an illustrative embodiment, the consistency check request corresponds to a request to determine whether invalidity information maintained by the network storage provider 110 is indicative that the corresponding resource should be invalidated.

At block 626, the cache management component obtains the consistency check information from a corresponding origin source. At block 628, the cache management component processes the returned consistency check information to identify inode numbers that should be considered to be invalid (or invalid entries). As previously described, the results of the consistency check can include information indicating that the inode is no longer valid. Additionally, or alternatively, the results of the consistency check can include information that is processed by the cache management component 122 to determine whether the inode is valid. For example, the results of the consistency check can correspond to blocks of data used to update the information stored in the inode data structure. Accordingly, a determination of whether the information identifying the inode as valid or invalid would not be available until after the processing and incorporation of such update information. In an alternative embodiment, the cache management component may determine that the satisfaction of the expiration criteria is sufficient to consider the resource invalid. In such an embodiment, the consistency check request would not need to be transmitted.

For invalid tracking information entries, the resource cache component can process the previously maintained resource in a number of ways. In one embodiment, at block 630, the resource cache component can transmit requests for updated resources. The requests for the updated resources can be transmitted to the origin source from which the previous version of the resource was obtained. Alternatively, the consistency check information, or other information maintained in the inode data structure, can identify one or more different origin sources for the resource to be updated. At block 632, the resource cache component obtains the updated sources from the corresponding origin source. At block 634, the cache management component updates the tracking information. In an illustrative embodiment, the updating of the tracking information can include resetting the expiration criteria, substituting new expiration criteria and the like. Additionally, although blocks 630-634 relate to obtaining updated versions of an invalid resource, in different embodiments, the cache management component or resource cache component can designate the resource as stale, invalid, corrupt, unavailable or include warnings that the information may not be accurate.

At decision block 636, a test is conducted to determine whether cache management component should notify other resource cache components associated with other POPs. In an illustrative embodiment, one or more entries in the inode data structure can include information identifying one or more POPs that are believed to store the corresponding resource. If the inode data structure, or other information, does not identify another cache management component, the routine 620 proceeds to block 640. Alternatively, if the inode data structure includes information identifying one or more cache management components to notify of the invalid entry, at block 638, the cache management component transmits an invalid entry notification to the identified cache management components. As previously described, the identification of the cache management components identified in the inode data structures may be provided by the network storage provider 110 or CDN service provider 106. Additionally, the identification of cache management components can also be facilitated through peer-to-peer distribution models. At block 640, the routine 620 terminates.

Figure 6C:
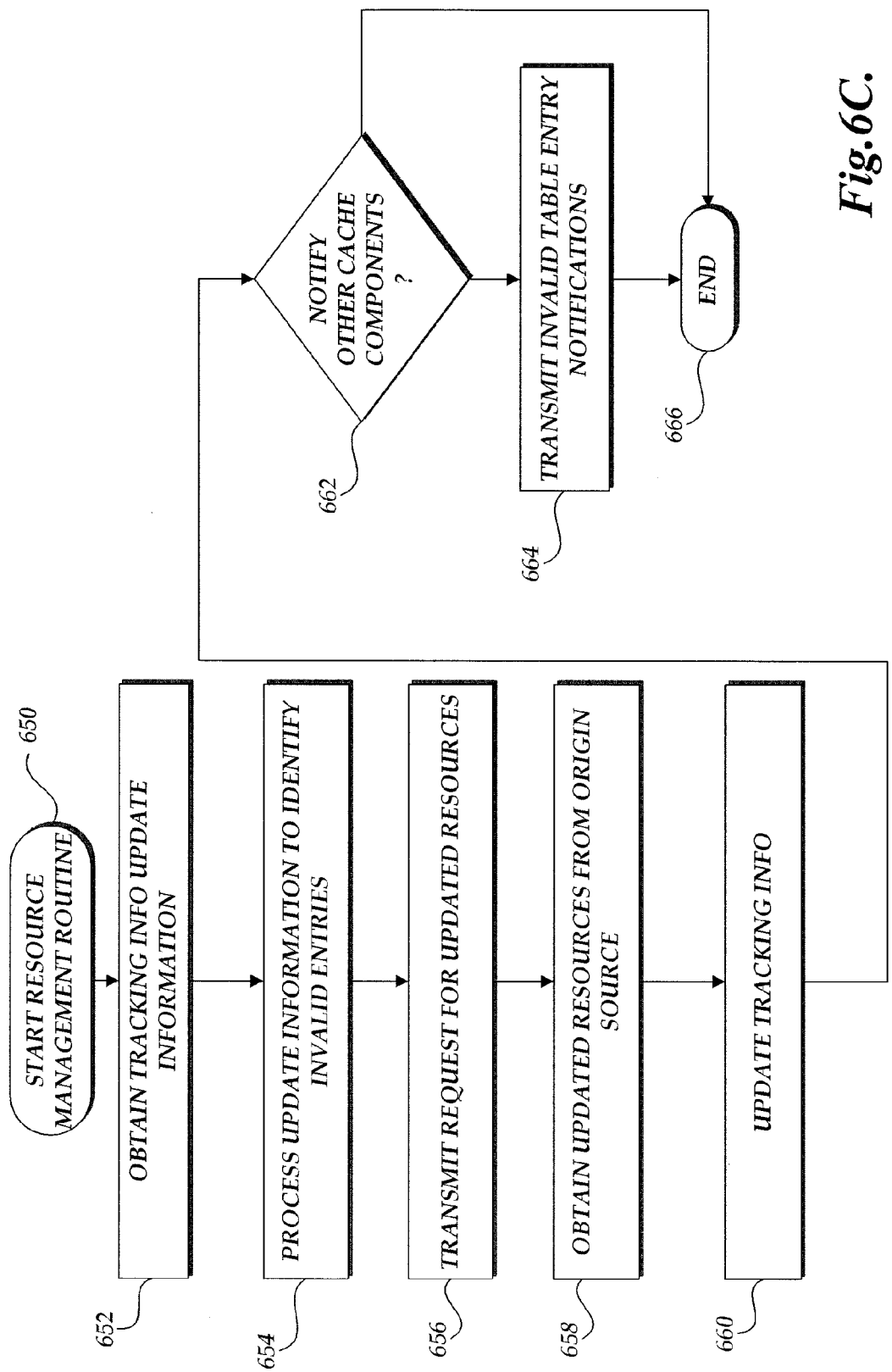

With reference now to FIG. 6C, a resource management routine 650 implemented by a cache management component will be described. In an illustrative embodiment, routine 650 can be utilized to manage resources utilizing tracking information, such as an inode data structure, and update information provided by an origin source, such as network storage provider 110, management component of a CDN service provider 106, or other third party. Such an embodiment was illustrated with regard to FIGS. 4A and 4B. At block 652, the cache management component obtains the update information from a corresponding origin source. In an illustrative embodiment, the update information identifies inodes that are determined to be invalid without requiring the transmission of the consistency check. At block 654, the cache management component processes the returned update information to identify inode numbers that should be considered to be invalid (or invalid entries). As previously described, the inode data structure can be maintained in a tree structure that facilitates the identification of invalid entries.

For invalid tracking information entries, the resource cache component can process the previously maintained resource in a number of ways. In one embodiment, at block 656, the resource cache component can transmit requests for updated resources. The requests for the updated resources can be transmitted to the origin source from which the previous version of the resource was obtained. Alternatively, the update information, or other infoiination maintained in the inode data structure, can identify one or more different origin sources for the resource to be updated. At block 658, the resource cache component obtains the updated sources from the corresponding origin source.

At block 660, the cache management component updates the tracking information. In an illustrative embodiment, the updating of the tracking information can include resetting the expiration criteria, substituting new expiration criteria and the like. Additionally, although blocks 656-660 relate to obtaining updated versions of an invalid resource, in different embodiments, the cache management component or resource cache component can designate the resource as stale, invalid, corrupt, unavailable or include warnings that the information may not be accurate. At decision block 662, a test is conducted to determine whether cache management component should notify other resource cache components associated with other POPs. In an illustrative embodiment, one or more entries in the inode data structure can include information identifying one or more POPs that are believed to store the corresponding resource. If the inode data structure, or other information, does not identify another cache management component, the routine 650 proceeds to block 666. Alternatively, if the inode data structure includes information identifying one or more cache management components to notify of the invalid entry, at block 638, the cache management component transmits an invalid entry notification to the identified cache management components. Additionally, the identification of cache management components can also be facilitated through peer-to-peer distribution models. At block 666, the routine 650 terminates.

Figure 6D:
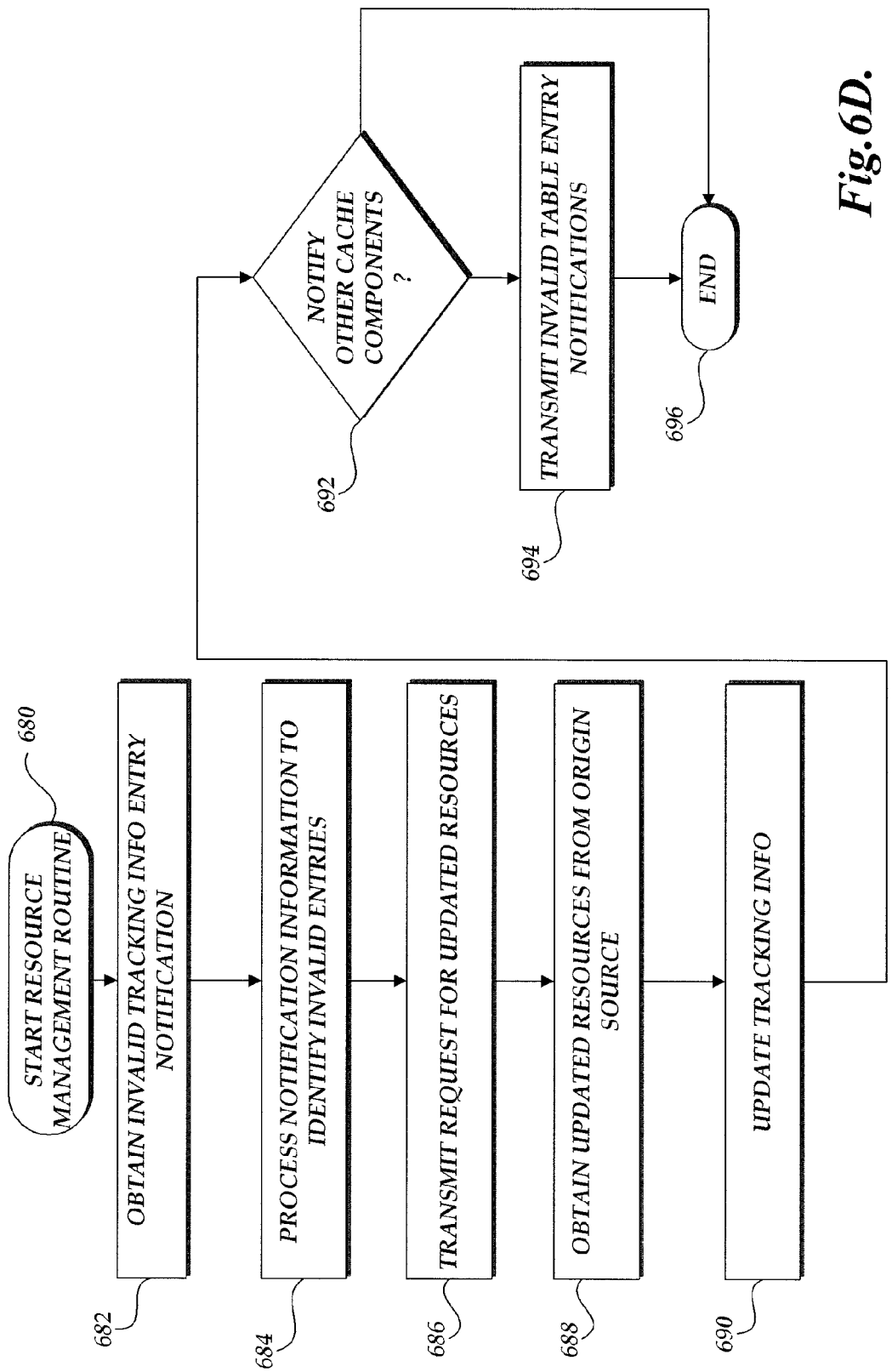

With reference now to FIG. 6D, a resource management routine 680 implemented by a cache management component will be described. In an illustrative embodiment, routine 680 can be utilized to manage resources utilizing tracking information, such as an inode data structure, based on an invalid tracking information notification received from another cache management component. An embodiment of this interaction was illustrated with regard to FIGS. 5A and 5B. At block 682, the cache management component obtains the invalid tracking information entry notification from another cache management component. At block 684, the cache management component processes the invalid tracking information notification to identify inode numbers that should be considered to be invalid (or invalid entries).

For invalid tracking information entries, the resource cache component can process the previously maintained resource in a number of ways. In one embodiment, at block 686, the resource cache component can transmit requests for updated resources. The requests for the updated resources can be transmitted to the origin source from which the previous version of the resource was obtained. Alternatively, the invalid entry notification information, or other information maintained in the inode data structure, can identify one or more different origin sources for the resource to be updated. At block 688, the resource cache component obtains the updated sources from the corresponding origin source. At block 690, the cache management component updates the tracking information. In an illustrative embodiment, the updating of the tracking information can include resetting the expiration criteria, substituting new expiration criteria and the like. Additionally, although blocks 686-690 relate to obtaining updated versions of an invalid resource, in different embodiments, the cache management component or resource cache component can designate the resource as stale, invalid, corrupt, unavailable or include warnings that the information may not be accurate.

At decision block 690, a test is conducted to determine whether cache management component should notify other resource cache components associated with other POPs. In an illustrative embodiment, one or more entries in the inode data structure can include information identifying one or more POPs that are believed to store the corresponding resource. If the inode data structure, or other information, does not identify another cache management component, the routine 680 proceeds to block 696. Alternatively, if the inode data structure includes information identifying one or more cache management components to notify of the invalid entry, at block 694, the cache management component transmits an invalid entry notification to the identified cache management components. As previously described, the identification of the cache management components identified in the inode data structures may be provided by the network storage provider 110 or CDN service provider 106. Additionally, the identification of cache management components can also be facilitated through peer-to-peer distribution models. At block 696, the routine 680 terminates.

Figure 7A:
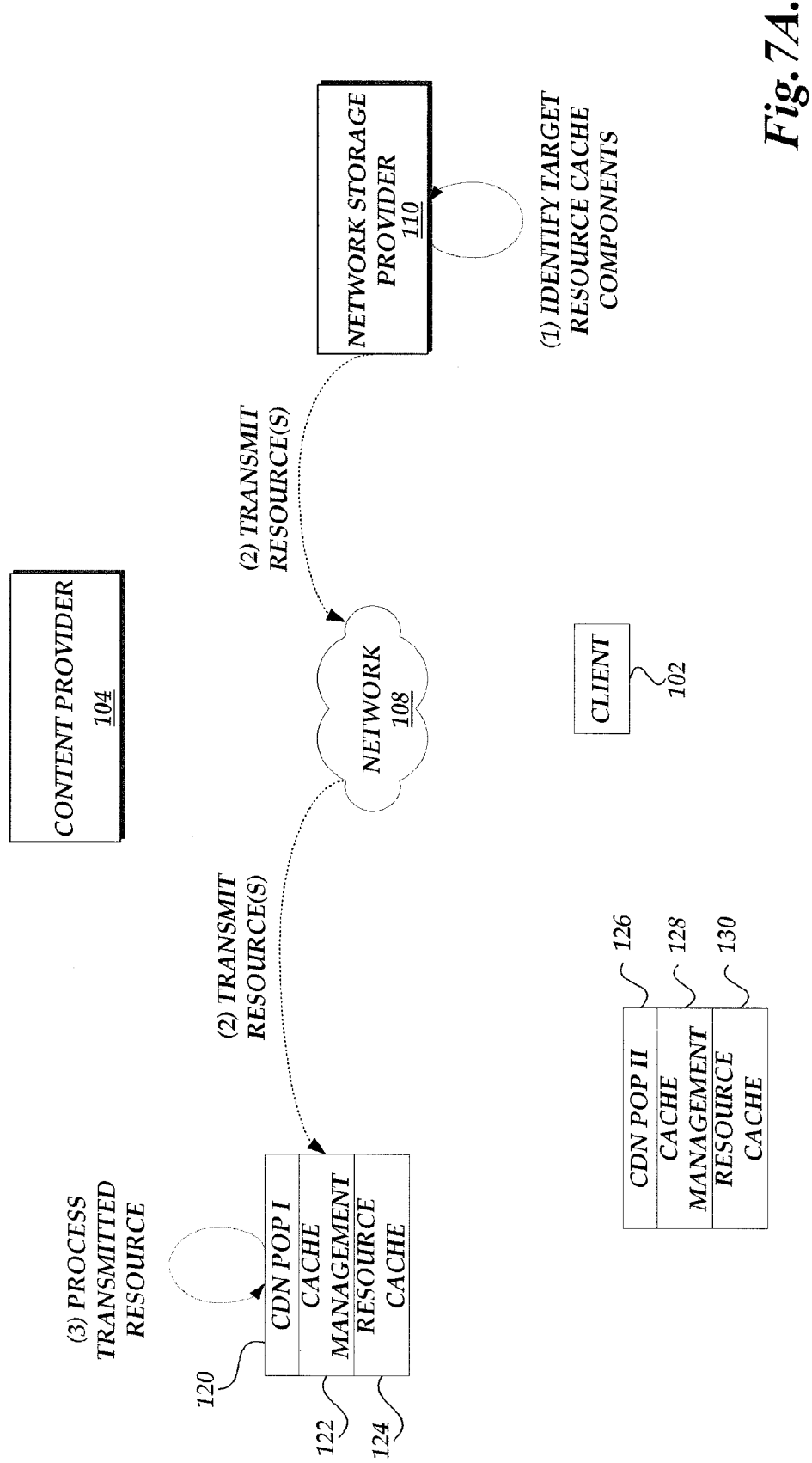
Figure 8:
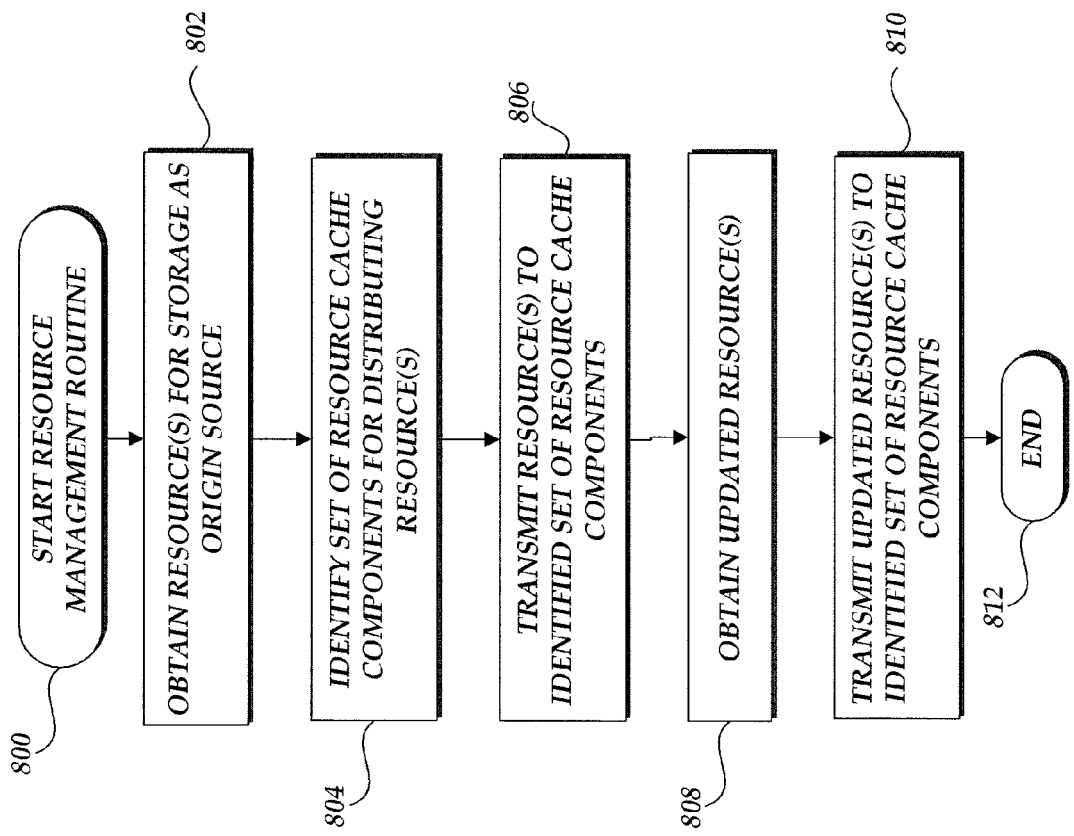
FIG. 8 is a flow diagram illustrative of a content management routine implemented by a network storage provider.

With reference now to FIGS. 7-8, another embodiment illustrating the interaction between various components of the content delivery environment 100 of FIG. 1 will be described. Specifically, FIGS. 7-8 illustrate an embodiment in which a network storage provider distributes resources to selected resource cache components without requiring a previous request. Additionally, the network storage provider 110 can transmit updates to the previously transmitted resources. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Referring to FIG. 7A, the storage service provider 110, such as via a SM component, obtains a resource such as from a content provider 104. The network storage provider 110 then identifies a target set of resource cache components that may receive the received resource or a set of resources. In an illustrative embodiment, network storage provider 110 may select all of the resource cache components associated with a CDN service provider 106. Alternatively, the network storage provider 110 may select a subset of resource cache components based on various criteria, such as geographic location, time zone, geopolitical criteria, geographic borders, usage criteria, resource utilization (real time or historical), criteria submitted by the resource cache components (including registration information) and the like. The network storage provider 110 then transmits the resource or set of resources to the selected resource cache components. In an illustrative embodiment, the selected resource cache components can process the received resource by either storing at least a subset of the resources in the resource cache component or otherwise rejecting some portion of the resources. For example, the resource cache component may be configured to accept unsolicited resource if processing/capacity resources are below a threshold level.

With reference now to FIG. 7B, after distribution of the resource to the selected set of resource cache components, network storage provider 110 obtains updated resources from the content provider 104 or otherwise determines that the previously distributed resources are invalid. The network storage provider 110 can then transmit the updated resource to one or more resource cache components previously known to have the previous version of the resource. In one embodiment, the network storage provider 110 can transmit the updated resource to the same set of resource cache components. In another embodiment, the network storage provider 110 may select a subset of the resource cache components that previously received the resource. For example, the network storage provider 110 may exclude any resource cache component that did not accept the previous version of the resource.

Turning now to FIG. 8, a routine 800 implemented by a network storage provider, such as via an SM component, will be described. It will be appreciate that any particular functionality associated with one of the components could be implemented by the other component illustrated in the content delivery environment 100, such as component associated with the CDN service provider 106 or components associated with a content provider 104. Additionally, the method may be implemented multiple components associated with the network source provider 108, by another component associated with a NSP POP or any component distributed across a communication network 108. At block 802, the network storage provider 110 obtains one or more resources for storage as an origin source. An illustrative registration of the network storage provider 110 was previously discussed with regard to FIG. 2A. At block 804, the network storage provider 110 identifies a set of resource cache component for distributing resources. In an illustrative embodiment, the set of resource cache components can include one or more resource cache components. Additionally, as previously described, the network storage provider 110 can select the set of resource cache components utilizing various organizational criteria. At block 806, the network storage provider 110 transmits one or more resources to the selected set of resource cache components. The network storage provider 110 can also associate additional sorting criteria in selecting the resources that are transmitted to the set of resource cache components. For example, resources can be selected based on popularity of resource, frequency of selection, estimated costs, service level agreements, and the like.

At block 808, the network storage provider 110 obtains updated resources. For example, the network storage provider 110 may obtain the updated resource from content provider 104. In another example, the network storage provider 110 may process or analyze the resource to determine that the resource is no longer valid or to update one or more parameters/values associated with the resource. At block 810, the network storage provider 110 transmits the updated resource to the set of resource cache components. As previously described, the network storage provider 110 may select only a subset of the set of resource cache components based on additional criteria. At block 812, the routine 800 terminates.

Figure 9A:
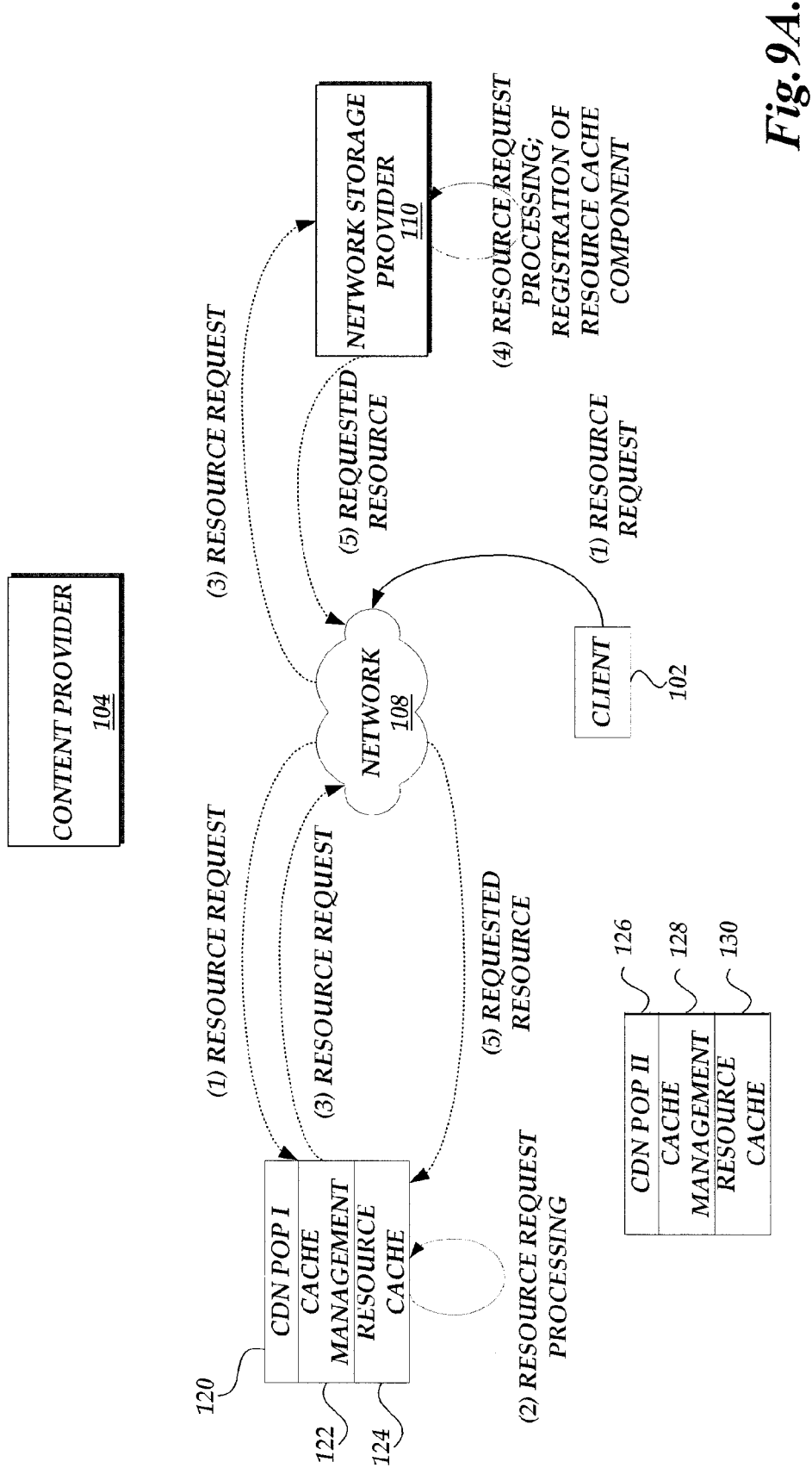
Figure 9D:
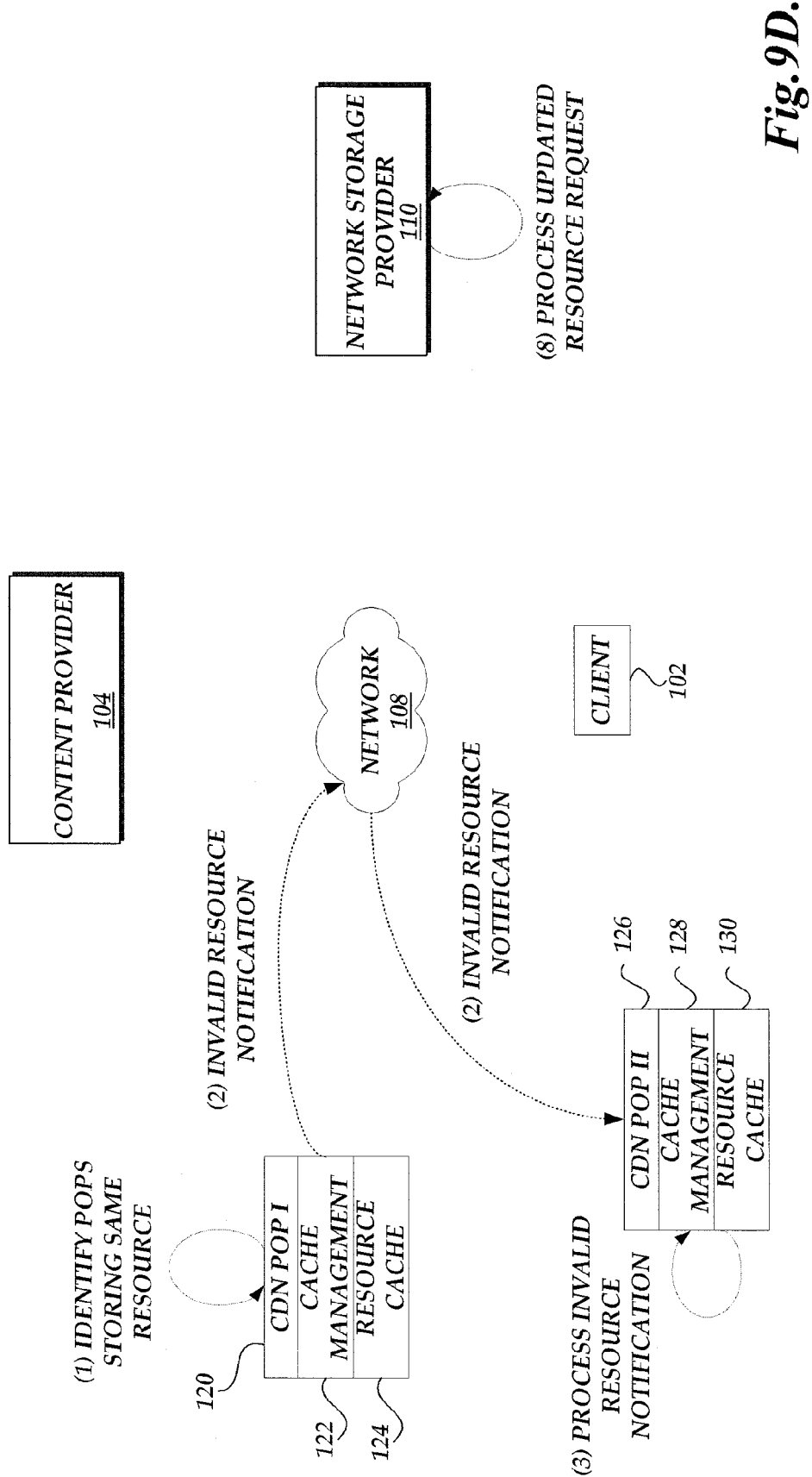
Figure 10:
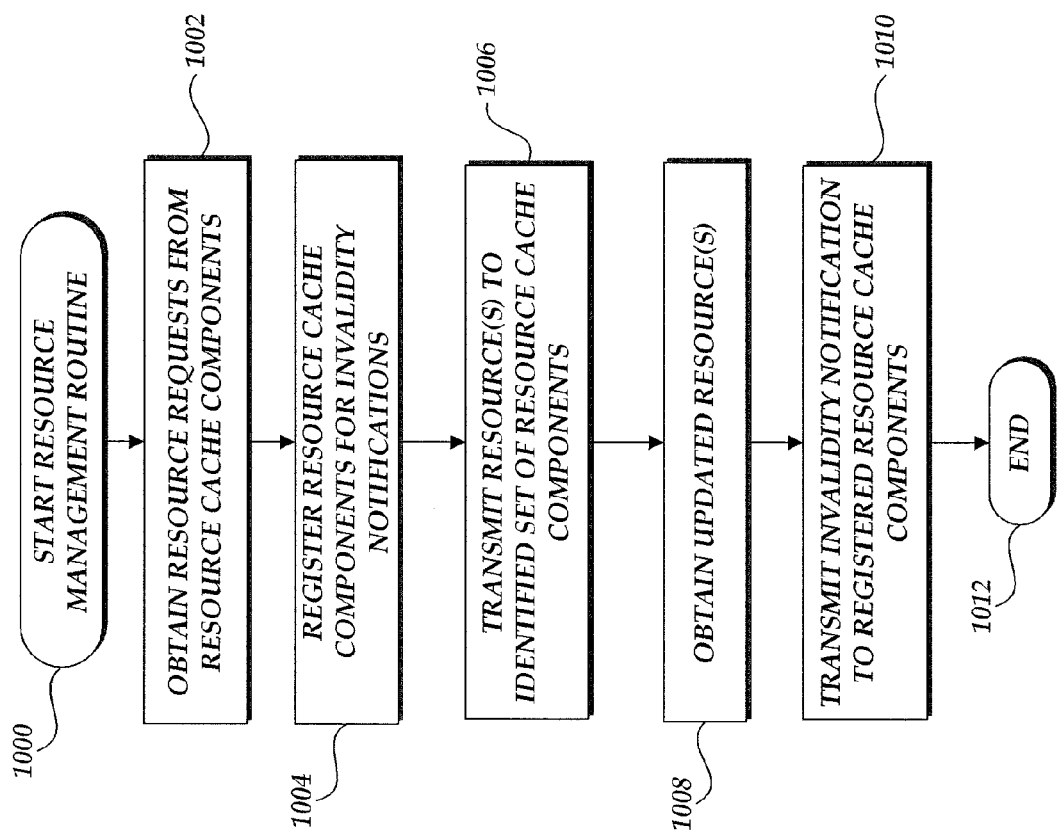
FIG. 10 is a flow diagram illustrative of a content management routine implemented by a network storage provider.

With reference now to FIGS. 9-10, another embodiment illustrating the interaction between various components of the content delivery environment 100 of FIG. 1 will be described. Specifically, FIGS. 9-10 illustrate an embodiment in which the network storage provider 110 provides a notification service in which various resource cache components can register and receive notifications for the request of updated resources from the network storage component 110. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 9A, a client computing device 102 subsequently generates a content request that is received and processed by the content provider 104, such as through the Web server 112. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers will generally in the form of the modified URLs, described above.

Upon receipt of the requested content, the client computing device 102, such as through a browser software application, begins processing any of the markup code included in the content and attempts to acquire the resources identified by the embedded resource identifiers (e.g., the embedded, modified URLs). Although not illustrated in FIG. 9A (or will be described in detail), the acquisition of the identified resources begins with the issuance of DNS queries by the client computing device 102 that are resolved by identifying an IP address corresponding to a CDN service provider POP that will attempt to provide the subsequently requested content. For purposes of illustration in FIG. 9A, it is assumed that the client computing device 102 has been provided the IP address of POP I 120. Accordingly, the client computing device 102 can begin issuing content requests, such as requests corresponding to the hypertext transfer protocol ("HTTP"), to POP I 120, which in turn are processed by resource cache component 124. If a requested resource is maintained by the resource cache component 124, the resource cache component can provide the requested resource to the client computing device 102.

Alternatively, if the resource cache component 124 does not maintain the requested resource, as illustrated in FIG. 9A, the resource cache component transmits a resource request to the origin source identified in the resource request, such as in a URL corresponding to the resource request or via information maintained by the resource cache component. For purposes of illustration, it is assume that storage service provider 110 operates as the origin source, or origin server, for the requested resource on behalf of the content provider 104. The storage service provider 110, or NSP POP, processes the resource request and provides the requesting resource cache component with the requested resource. In this illustrative embodiment, the cache management component 122 or resource cache component 124 can include a registration request to the network storage provider 110. The registration request corresponds to a request to receive notification if the requested resource is updated. In one embodiment, the registration request can be included as part of the resource request or be automatically interpreted with receipt of a resource request. Alternatively, the registration request may be implemented as a separate transaction. The resource cache component 124 can then provide the client computing device 102 with the requested resource.

With reference now to FIGS. 9B and 9C, after the distribution of the resource to the resource cache component 122, the network storage provider 110, such as via an SM component, identifies one or more resources to be updated. For example, the network storage provider 110 may obtain updated resources from the content provider 104 or otherwise determine that the previously distributed resources are invalid. As illustrated in FIG. 9 Based on the determination of an updated resource, the network storage provider 110 identifies the resource cache components (or cache management components) that have previously registered to receive notifications. The network storage provider then transmits the notifications to the registered resource cache components. With reference to FIG. 9C, based on the processing of the notification, the resource cache component then transmits an updated resource request to the network storage provider 110. The network storage provider 110 can then transmit the updated resource to the resource cache component responsive to the updated resource request.

In one embodiment, upon receipt and processing of the notification from the network storage provider, the resource cache component (or cache management component) can also distribute additional notifications to peer resource cache components. With reference to FIGS. 9D and 9E, in an illustrative embodiment, the resource cache component can maintain tracking, such as the inode data structure previously described, to identify other resource cache components that may also be maintained the previous version of the resource that has been identified as invalid. Accordingly, the cache management component 122 utilizes the information to identify one or more resource cache components that have the resource.

With reference now to FIG. 9B, the receiving cache management component 128 can then component transmits a request for an updated resource. The request can then be processed by the network storage component, which provides the updated resource, or set of resources. The resource management component 128 can then process the incoming updated resources in a manner as described with regard to FIG. 9a. Alternatively, the cache management component 128 may be configured in a manner such that updates are received from the network storage provider 110 only by a designated resource cache component 122. In this embodiment, the cache management component 128 would not need to update any additional tracking information.

Referring now to FIG. 10, a routine 1000 implemented by a network storage provider, such as via an SM component, will be described. It will be appreciate that any particular functionality associated with one of the components could be implemented by the other component, by multiple components or by another component associated with a NSP POP or any component distributed across a communication network 108. At block 1002, the network storage provider 110 obtains one or more resource requests from resource cache components. Based on the resource requests (or based on a separate request), at block 1004, the network storage provider registers resource cache components to receive notifications regarding the invalidity of the requested resources.

At block 1006, the network storage provider 110 transmits the requested resource to the identified set of resource cache components response to the resource requests. At block 1008, the network storage provider 110 obtains updated resources. For example, the network storage provider 110 may obtain the updated resource from content provider 104. In another example, the network storage provider 110 may process or analyze the resource to determine that the resource is no longer valid or to update one or more parameters/values associated with the resource. At block 1010, the network storage provider 110 transmits the updated resource notification to the set of resource cache components that previously registered with the network service provider 110. The receiving resource cache components can then request the updated resource from the network storage provider. At block 1012, the routine 1010 terminates.

One skilled in the relevant art will appreciate that the various embodiments described with regard to FIGS. 2-6, 7-8, and 9-10 may be practiced independently by the network storage provider 100 and CDN service provider 106. Additionally, a network storage provider 110 or CDN service provider 106 may combine one or more of the embodiments based on particular financial costs, the number of NSP POPs or CDN POPs, financial criteria, service level criteria and the like.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A hardware system for managing content requests comprising:
   memory for maintaining entries in tracking information, the entries identifying requested resources; and
   at least one hardware processor corresponding to a content delivery service provider operative to host or process content on behalf of an origin source, the at least one hardware processor executing instructions to:
      associate resources obtained from the origin source with entries in the tracking information;
      determine one or more entries in the tracking information are invalid prior to termination of expiration criteria associated with one or more resources corresponding to the one or more entries, wherein the determination is based on processing consistency check information received from the origin source or a third party component; and
      update, at the content delivery service provider, the one or more resources corresponding to the one or more determined invalid entries in the tracking information.

2. The system as recited in claim 1, wherein the tracking information corresponds to an inode data structure.

3. The system as recited in claim 2, wherein the entries in the inode data structure are arranged in a tree structure.

4. The system as recited in claim 3, wherein the at least one processor determines an invalid entry by receipt of update information corresponding to the tree structure.

5. The system as recited in claim 1, wherein the at least one processor is further operative to:
   associate expiration criteria associated with individual resources obtained from the origin source with individual corresponding entries in the tracking information; and
   determine satisfaction of the expiration criteria associated with at least one entry in the tracking information.

6. The system as recited in claim 5, wherein, responsive to a determination that the expiration criteria has not been met, the at least one processor is further operative to:
   transmit a consistency check request to the origin source; and
   process responsive consistency check information to determine whether entries in the tracking information are invalid.

7. The system as recited in claim 1, wherein updating the one or more resources comprises requesting an updated resource from the origin source based on the determination of invalid tracking information entries.

8. The system as recited in claim 1, wherein the at least one processor is further operative to:
   transmit a consistency check request to the origin source based on satisfaction of expiration criteria; and
   process responsive consistency check information to determine whether entries in the tracking information are invalid.

9. The system as recited in claim 1, wherein updating the one or more resources comprises requesting an updated resource based on the determination of invalid tracking information entries.

10. A computer-implemented method for managing resources comprising:
    as implemented by one or more computing devices configured with specific executable instructions, the one or more computing devices corresponding to a content delivery network service provider that hosts or processes content on behalf of an origin source, and the one or more computing devices include a hardware computing device,
       associating requested resources obtained from the origin source with entries in tracking information, the entries identifying the requested resources;
       determining one or more entries in the tracking information are invalid prior to termination of expiration criteria associated with one or more resources corresponding to the one or more entries, wherein the determination is based on processing consistency check information received from the origin source or a third party component; and updating, at the content delivery network service provider, the one or more resources corresponding to the one or more determined invalid entries in the tracking information.

11. The method as recited in claim 10, wherein the tracking information corresponds to an inode data structure.

12. The method as recited in claim 11, wherein the entries in the inode data structure are arranged in a tree structure.

13. The method as recited in claim 12, wherein determining one or more entries in the tracking information are invalid is further based on receipt of update information corresponding to the tree structure.

14. The method as recited in claim 10 further comprising:
associating expiration criteria associated with individual resources obtained from the origin source with individual corresponding entries in the tracking information; and
determining satisfaction of the expiration criteria associated with at least one entry in the tracking information.

15. The method as recited in claim 14 further comprising:
responsive to a determination that the expiration criteria has not been met,
transmitting a consistency check request to the origin source; and
processing responsive consistency check information to determine whether entries in the tracking information are invalid.

16. The method as recited in claim 10, wherein updating the one or more resources comprises requesting an updated resource from the origin source based on the determination of invalid tracking information entries.

17. The method as recited in claim 10 further comprising:
transmitting a consistency check request to the origin source based on satisfaction of expiration criteria; and
processing responsive consistency check information to determine whether entries in the tracking information are invalid.

18. The method as recited in claim 10, wherein updating the one or more resources comprises requesting an updated resource based on the determination of invalid tracking information entries.

19. A non-transitory, computer-readable medium containing computer-executable instructions for managing resources, the computer-executable instructions comprising:
first instructions that, when executed by a hardware processor, cause the hardware processor to:
associate requested resources obtained from an origin source with entries in tracking information, the entries identifying the requested resources;
determine one or more entries in the tracking information are invalid prior to termination of expiration criteria associated with one or more resources corresponding to the one or more entries, wherein the determination is based on processing consistency check information received from a origin source or a third party component; and
update the one or more resources corresponding to the one or more determined invalid entries in the tracking information.

20. The non-transitory, computer-readable medium as recited in claim 19, wherein the tracking information corresponds to an inode data structure.

21. The non-transitory, computer-readable medium as recited in claim 20, wherein the entries in the inode data structure are arranged in a tree structure.

22. The non-transitory, computer-readable medium as recited in claim 21, wherein determining one or more entries in the tracking information are invalid is further based on receipt of update information corresponding to the tree structure.

23. The non-transitory, computer-readable medium as recited in claim 19, wherein updating the one or more resources comprises requesting an updated resource from the origin source based on the determination of invalid tracking information entries.

24. The non-transitory, computer-readable medium as recited in claim 19 further comprising second instructions that, when executed by a processor, cause the processor to:
transmit a consistency check request to the origin source based on satisfaction of expiration criteria; and
process responsive consistency check information to determine whether entries in the tracking information are invalid.

25. The non-transitory, computer-readable medium as recited in claim 19, wherein processing the one or more resources comprises requesting an updated resource based on the determination of invalid tracking information entries.

* * * * *